United States Patent [19]

Preston et al.

[11] Patent Number: 5,174,759

[45] Date of Patent: Dec. 29, 1992

[54] TV ANIMATION INTERACTIVELY CONTROLLED BY THE VIEWER THROUGH INPUT ABOVE A BOOK PAGE

[76] Inventors: Frank S. Preston, 413 Hempstead Rd., Williamsburg, Va. 23188; Preston E. Blair, 3465 Crestline Way, Soquel, Calif. 95073

[21] Appl. No.: 442,230

[22] Filed: Nov. 28, 1989

Related U.S. Application Data

[63] Continuation-in-part of Ser. No. 228,946, Aug. 4, 1988, abandoned.

[51] Int. Cl.[5] .................... G06F 15/44; G06F 15/00
[52] U.S. Cl. .................................. 434/317; 364/410; 364/419; 434/307; 434/335
[58] Field of Search ........ 364/410, 411, 200 MS File, 364/900 MS File; 434/336, 335, 307-309, 317; 273/430

[56] References Cited

U.S. PATENT DOCUMENTS

| | | | |
|---|---|---|---|
| 4,403,965 | 9/1983 | Hawkins | 434/327 |
| 4,695,953 | 9/1987 | Blair et al. | 364/410 |
| 4,711,543 | 12/1987 | Blair et al. | 352/87 |
| 4,820,167 | 4/1989 | Nobles et al. | 434/336 |
| 4,839,743 | 6/1989 | Best et al. | 358/310 |
| 4,847,700 | 7/1989 | Freeman | 358/343 |
| 4,855,725 | 8/1989 | Fernandez | 340/706 |
| 4,972,496 | 11/1990 | Scklarew | 382/13 |

Primary Examiner—Roy N. Envall, Jr.
Assistant Examiner—A. Bodendorf
Attorney, Agent, or Firm—Davis & Schroeder

[57] ABSTRACT

A video system enables the operator to repeatedly touch a study object to change the action according to dramatics or game on a video display.

A educational embodiment enables that student to touch the page of a printed book and effect multiple types of video response, selected on page by a student, educating the student of the meaning of the point in the printed text or graphics touched. A similar embodiment provides a solid object the student touches to effect multiple animations. Multiplexed workbooks and monitors enable the teacher's writing or drawing in workbook to be displayed on all, or selected, monitors. Questioning by the animation or in the workbook is answered by touching designated areas in the multiplexed workbooks to select an answer, which is timed, graded, and recorded for the teacher's reference. The animation responds to the student answers. Animation location coordinates coded in the tracks of recorded video images are compared to player and instrument position coordinates obtained by ultrasonic detection.

18 Claims, 17 Drawing Sheets

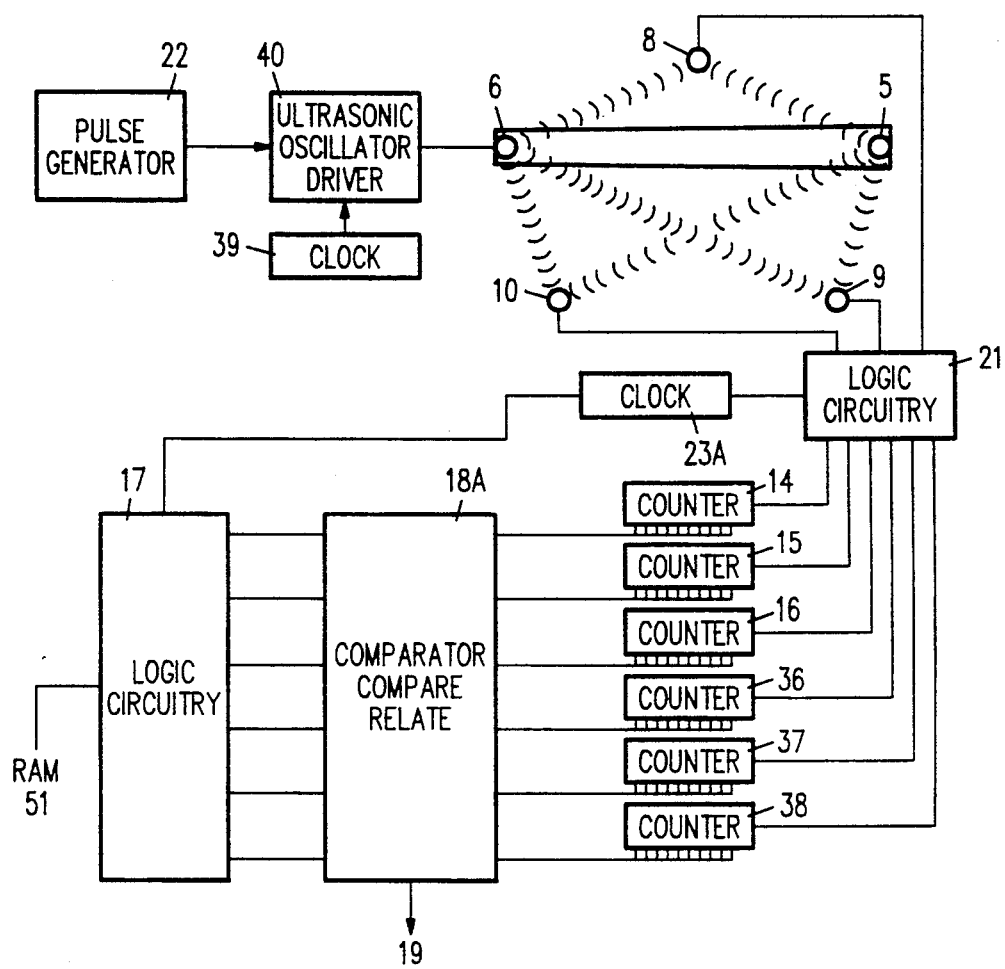
FIG. 20
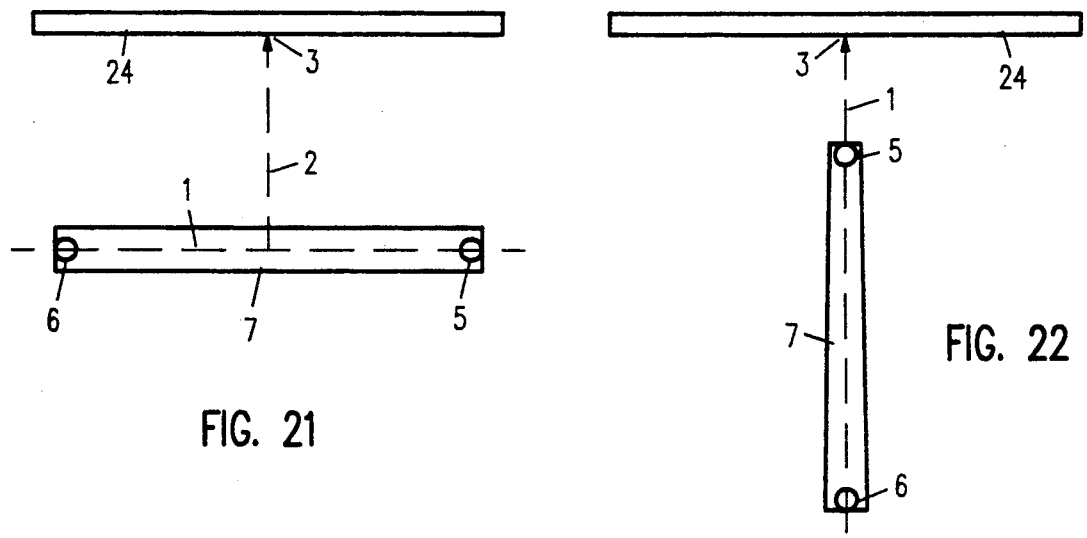
FIG. 21
FIG. 22

TV ANIMATION INTERACTIVELY CONTROLLED BY THE VIEWER THROUGH INPUT ABOVE A BOOK PAGE

CROSS REFERENCE TO RELATED APPLICATION

The application is a continuation-in-part of application Ser. No. 07/228,946, filed Aug. 4, 1988, now abandoned.

BACKGROUND OF THE INVENTION

The present invention relates generally to interactive video systems and to improvements in U.S. Pats. Nos. 4,695,953 and 4,711,543 entitled TV Animation Interactively Controlled by the Viewer. More particularly, the present invention relates to a method and apparatus wherein a viewer dynamically interacts with an animated video presentation to control action sequences and enable rapid and repeated switching of multiple tracks of recorded data representing different actions while retaining a continuous action sequence, and enable branching at the termination of an action sequence by effecting track rewind.

U.S. Pat. No. 4,695,953 teaches a double-circuit video system that in one embodiment enables a player to repeatedly touch or hit an animated character during a continuous action scene as displayed on a projection screen or video monitor and thus change the action repeatedly. Another embodiment enables a player to swing a racket before the screen or video monitor, hit the mid-air projected image of a perspective ball animated action, return the ball back to the animated character opponent, and play a simulated game during which the player exercises the same skills used to play the game simulated. An ultrasonic transducer in a playing instrument and a microphone combination disposed on the video monitor face or at angles to the playing action permits the calculation of a signal representing the monitor contact position or the mid-air position of the playing instrument action relating to the game. The signal thus calculated is compared to a similar representation of the position of the character or object in the associated frame of the animation displayed by the video monitor and digitally coded on tape or disc.

U.S. Pat. No. 4,711,543 teaches a method of animation to provide smooth animation displayed on the video monitor of a continuous action scene during rapid and repeated switching of multiple tracks of data representing different animation action sequences.

While the interactive video systems disclosed by the above-cited U.S. patents admirably fulfill the roles of educational and amusement systems, it it a primary objective of the present invention to extend the capabilities and effectiveness of such systems.

SUMMARY OF THE INVENTION

The present invention provides an improvement of the interactive video system disclosed in U.S. Pat. Nos. 4,695,953 and 4,711,543, the improvement comprising a combination of an ultrasonic transducer at the contact tip of a hand-held pen indicator and an array of one or more microphones, the microphone array mounted in a frame cover adjusted in a registered position over each printed page of a book permits a calculation of the position of the contact points of the pen to the book page. Such calculated positions are compared to coded animation production positions of said book page to effect multiple types of response to pen indicated page position by switching and rewinding to multiple tape or disk positions multiple tracks of recorded animation during continuous action scenes displayed on a television screen or video monitor. Prerecorded or synthesized sound tracks associated with the animated sequences may also be initiated to provide dialogue or explanatory information associated with the pen indicated page positions. Printed typography, graphics, keyboards, circuits, flow charts, diagrams, illustrations, printed music, or languages may be touched to effect multiple types of animated response of action to the inanimate page or analysis. The type of response to each indicated page position is selected by the student by touching printed indexes or diagrams on the page.

In a first embodiment, a student working at a workbook utilizes the pen indicator to either respond to monitor stimuli or to effect video monitor response to the student's indicated book position stimuli. The meaning of the student performance is determined and evaluated and the response is timed and scored. The student performance is then graded and processed for recording purposes.

A plurality of monitors and said book embodiments are operated in a multiplexed mode to serve a system comprising a number of students and an instructor. Means provided enable the instructor to write or draw in said book embodiment and effect the display of this writing or drawing on all, or selected, student monitors. The instructor's writing or drawing may appear overlaying displayed animation, a video reproduction of a selected book page, or appear on a blank screen. Means of audio communication between the teacher and all, or selected, students is provided.

Means enable a student to touch printed keyboards on the pages of said book embodiment with an indicating instrument to operate a computer or a computer with printer. Simplified keyboards consolidating multiple key computer functions enable a child or a person without any computer skills to operate a computer in a sophisticated manner with a related display of animation graphics.

In an alternative embodiment, positions on a three dimension object may be contacted to effect the display of animation and associated sound explaining and analyzing the indicated points or areas of said object in multiple modes similar to the book embodiment.

In another embodiment comprising two ultrasonic transducer installed at the barrel end and at the sighting positions of a rifle simulation and a microphone array disposed at angles to said rifle produce double readouts of the mid-air positions of said transducers when the rifle is aimed at a point on a monitor screen and during the fraction of a second when the player pulls the trigger. A calculation of the rifle position and angle relative to the monitor screen produces screen target position digital equivalent which is compared to animation screen position coded data to effect an animated reaction.

Other embodiments provide interactive dramatics between the animation and the player. The measurement of the player's speed, direction and area of movement provides signals which initiate related reactions in the animation. An embodiment provides modular robotic apparatus also reacting to the direction, speed, and movement area of the animation and the player. Such robotics may also be manually operated.

The capabilities of the interactive video system disclosed in the above-referenced patents are greatly increased by the incorporation of a computer and printer. Coupled to the system secondary circuit the computer may control or supplement the system, and the printer can either produce graphics or alphanumeric characters based on the operator's touch of a printed page keyboard as described.

BRIEF DESCRIPTION OF THE DRAWING

The invention will be more fully comprehended from the following detailed description and accompanying drawing in which:

FIG. 20 is a functional block diagram of an alternate input circuit and indicator apparatus incorporating ultrasonic transducer to the system shown in FIG. 1.

FIG. 21 diagrams a line projected from the centerpoint and normal to a projected line between the transducer of the modular indicator apparatus shown in FIG. 20.

FIG. 22 diagrams a line projected through the transducer of the modular indicator apparatus shown in FIG. 20 intersecting a video monitor screen.

DETAILED DESCRIPTION OF THE PREFERRED EMBODIMENT

Figure 1:
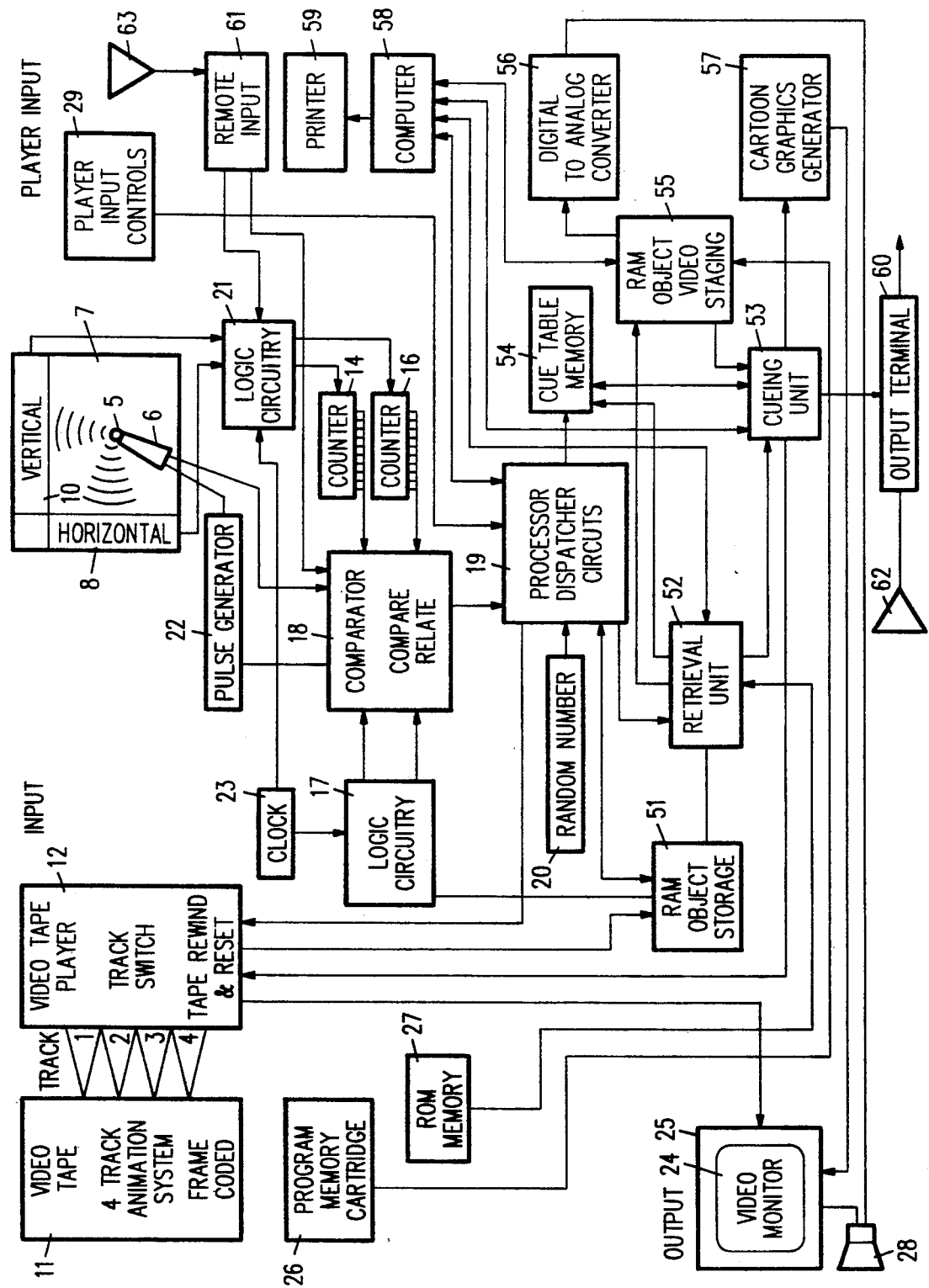
FIG. 1 is a schematic block diagram showing one embodiment of the present invention using a video-tape and a video-tape reader for the primary circuit and a secondary circuit of digitally produced animation which may be used for scoring and diagram scenes.

Referring to FIG. 1, there is shown a block diagram of the invention educational and amusement video system as a combination of two different types of video-game circuits. The details and functions of the circuits shown in FIG. 1 are more fully described in U.S. Pats. Nos. 4,695,953 and 4,711,543 hereby incorporated by reference as if fully set forth herein. The primary circuit provides operational control of the system and incorporates camera-originated motion pictures with audio as supplied in this embodiment by video tape 11 and video tape player 12. A secondary circuit incorporates digitally produced or stored animation, a user controlled computer 58, a printer 59 and a multi-function output terminal 60.

Figure 2:
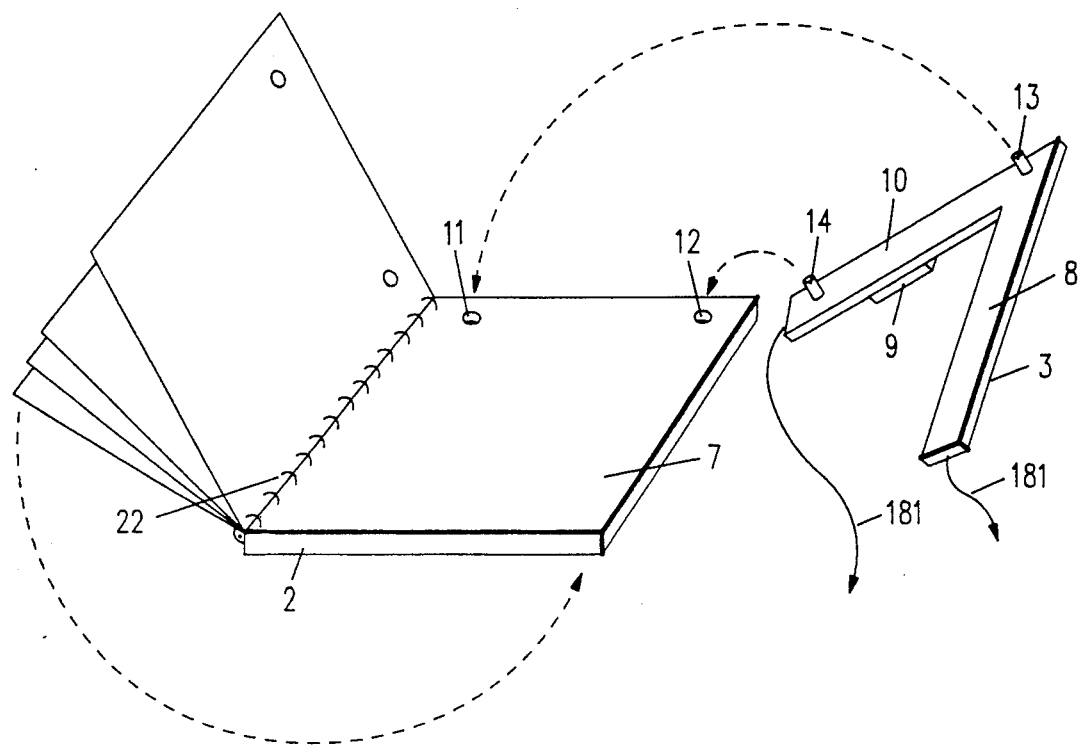
FIG. 2 is a diagram in perspective of a book and half-frame microphone array illustrating a second embodiment of the present invention.
Figure 3:
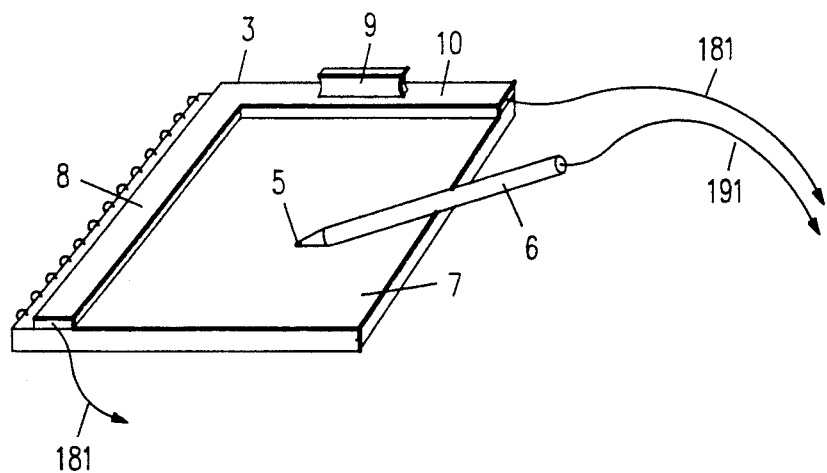
FIG. 3 is a diagram in perspective illustrating the book and half-frame microphone array of FIG. 2 assembled in accordance with the present invention.

Referring to FIGS. 2 and 3, there is shown an embodiment of the present invention of a book 2 displaying printed graphics and typography on pages 7. The book pages 7 corresponds to the contact surface 7 shown in the secondary circuit of FIG. 1. The book pages 7 are bound 20 to enable the pages to lay in a vertical stack. Accordingly, the peg holes 11 and 12 at the upper corners of pages 7 form a vertical cavity accepting the protruding pegs 13 and 14 that are mounted on a half frame 3 containing two ultrasonic strip microphones 8 and 10 installed in each of the two mutually perpendicular sides. The half frame 3 strip microphones 8, 10 corresponds to the vertical and horizontal strip microphones 8, 10 as shown in FIG. 1 and are coupled to logic circuit 21 by cables 181. The half frame 3 is held by the operator with handle 9 and fitted into peg holes 11 and 12 on pages 7 in a registered position, as shown in FIG. 3. An indicating instruments or pen 6 incorporates an ultrasonic transducer 5 at the ball point tip and is coupled to comparator circuit 18 (as shown in FIG. 1) by cable 191. Pen 6 also includes an internal switch which indicates whether or not the transducer tip 5 is in contact with the surface of page 7. Pen 6 incorporates a pulse generator (not shown) or is coupled to pulse generator 22 (as shown in FIG. 1) by cable 191 which causes the transducer 5 to produce repetitive ultrasonic impulses. The impulses can be produced by a ceramic transducer or high voltage sparking between two electrodes on the pen 6. The strip microphones 8 and 10 together with transducer 5 in tip of pen 6 produce a signal which is responsive to the placement of the head of pen 6 on the book page 7. This signal is converted to digital form and compared to a digital readout of coded page positions. This comparison is used to determine a specific track of multiple tracks of animation, to determine a specific tape/disk position to rewind thereto according to the primary circuit of FIG. 1, or to determine specific prerecorded digtial animation for display or to produce digital animation according to the secondary circuit of FIG. 1. The multiple tracks of animation of video tape or disk 11 of FIG. 1, are camera-originated using the full theatrical-type animation production process or live action motion picture production optically retimed or analyzed for each frame's action and based on a frame exposure schedule sheet similar to an animator's exposure sheet, and whereon specific frames are digitally coded for animation image screen location coordinates or printed image page location coordinates. Said multiple tracks of motion pictures are displayed by video tape/disk player 12 and switched according to commands by processor 19 and cueing unit 53. Track rewind and reset is instructed by said processor 19 and cueing unit 53. The above described camera-originated animation may be replaced by prerecorded digital animation obtained from ROM 27, or digital animation produced to fit the requirements of the system by cartoon graphics generator 57.

The strip microphones 8 and 10, transducer 5, pen 6, and book page 7 of FIGS. 2 and 3 are indicated by the same numbers in the block circuit diagram of FIG. 1.

Referring to FIG. 1, the two strip micrphones 8 and 10 are responsive to the ultrasonic pulses produced by instrument 6. These microphones, in conjunction with clock 23, counters 14 and 16, and logic circuitry 21, measure the time delay for airborne propagation between the radiation of a pulse at instrument 6 and its arrival at the respective microphones 8 and 10. Logic circuitry 21 combines the outputs from microphones 8 and 10, pulse generator 22 and clock 23 to control counters 14 and 16 which count or measure the time delays. The measured time delays establish the coordinates of the location of contact tip 5 on the surface of book page 7 at the time of any particular pulse output. The application of this known ultrasonic method to detecting locations that are compared to coded animation location to effect the course of animation is unique and unknown.

The animator's field positions of the graphics (FIGS. 2-3) displayed on book page 7 is entered by the animator on specific frames of the production exposure sheet that instructs the exposure of those drawings that detail graphic positions to be contacted by instrument 6. Such locations per frame are converted to digital binary coordinates. The motion picture frames are counted, specified, and used to enter a table of values holding these graphic positions and vital data on the tape or disc at the beginning of each page episode of the animation. All of these numbers are stored in the circuit RAM 51 of FIG. 1 and retrieved when applicable to the animation display. The frame number is recorded at intervals on the video tape track 11 and used as a track guide. Special track coding allows fast rewinds to specific frames located from track signals. Referring to FIG. 1, the coded field positions with frame numbers are stored by player 12 from tape or disc 11 into RAM 51 at the beginning of each page episode. This table of values in RAM 51 supplies pertinent data to logic circuitry 17 on time to be compared to the coordinates of the pen 6 transducer tip 5 as it contacts the surface of book page 7.

The comparator circuit 18 of FIG. 1 compares the two field coordinates derived from the digital readouts of counters 14 and 16 to the two coordinates of the field and page 7 location of graphics locations from logic circuitry 17 and RAM 51. The comparator 18 instructs the processor circuit 19 if specific field coordinates coincide. Based on this data an order is dispatched to the system primary or secondary circuit to provide specific animation. If such order is dispatched by processor 19 to the primary circuit, the order is dispatched to video tape player 12 which switches between a plurality of tracks, indicated in this embodiment as 1,2,3, and 4, based on the program of the episode and track instructions from program memory cartridge 26, RAM 55, and cueing (cuing) unit 53. Or, the video tape player 12 may rewind to a position in the tracks, based on said program. If such order is dispatched to the secondary circuit, the processor 19 dispatches an order to cueing unit 53 via vue table memory 54.

Referring to FIG. 1, the secondary circuit animation and graphics is generated by cartoon graphics generator 57 from digital data which may be read along with digitalized audio from ROM memory 27 or other mass-storage device. Retrieval unit 52 is a conventional peripheral input reader-controller which transfers into memory the digitally coded blocks of information obtained from ROM memory 27. This information includes control data which retrieval unit 52 stores into random access memory (RAM) 51 for use by dispatcher unit 19, and audio/or graphics data which unit 52 stores into RAM 55 for use by cueing unit 53. The control data includes cue commands and schedule commands. Cue commands specify short term operation during an interval of time, while schedule commands represent longer term points of time, and form chains which define and relate to alternate (multiple track) schedule. Dispatcher 19 controls the course of the animation or graphics display, audio, and stores cue commands into cue table 54. Cueing unit 53 executes the cue commands. Cueing unit 53 repeatedly scans cue table 54 to get commands telling it what to do and the time it should be done. Dispatcher unit 19 may request successive blocks of control information from retrieval unit 52 and output into cue table memory 54 a schedule (called a cue table)

of operations for cueing unit 53. Dispatcher 19 repeatedly updates the cue table schedule as the animation progresses. Dispatcher 19 processes the various optional player input controls 29 which may input via conventional video game playing instruments and stores the different player commands into cue table 54.

As described, dispatcher 19 controls the course of the animation and stores cue commands into cue table 54. Cueing unit 53 executes the cue commands at the times specified therein by conveying to the cartoon graphics generator circuit 57 blocks of binary-coded data previously stored into RAM 55 by retrieval unit 52, and these blocks of data are used by the cartoon graphics generator 57 to generate animation frames which are then displayed on television monitor 25. Digital audio passes from ROM memory 27 through retrieval unit 52 to memory 55 to digital to analog converter 56 and hence to system speaker 28. The binary coded data stored into RAM 55 is reinforced by individual page or game data suplied by program memory cartridge 26.

The primary multiple track video tape animation circuit, which is diagrammed in FIG. 1, is operated and scheduled by the processor dispatcher 19 which has control of the course of the camera-originated animation. The comparator 18 furnishes the results of the player's action to the processor 19 which instructs the switching of multiple tracks 1, 2, 3, and 4 with game or sequence position to video tape player 12. At the termination of a game or sequence either random number generator 20, player input 29, or the placement of instrument 6 on page book 7 specifies an episode to processor 19 which instructs tape player 12 of the rewind.

The operation of both the primary and secondary animation circuits is controlled by processor 19 based on data from program memory 26 and ROM memory 27 and the operation of the secondary circuit retrieval, cueing, and memory circuits as described above. As ordered by processor 19, this instruction is sent to tape player 12 or cartoon graphics generator 57 by cueing unit 53. The digital memory cartridge 26 can be various types of memory and may be plugged in to change the scenario, provide digital data for each book page 7, or to replace video/audio means 11 and 12 and supply the coded animation used by the system.

The following invention embodiment distinguishes from prior art by operating the above technology with the touch of a pen instrument 6 to the printed page 7 while the parent inventions operate by touching instrument 6 to the face of the video monitor 24 or the mid-air measurement of the player's action in relation to projected foreshortened perspective animations. The following invention embodiment operates by comapring and relating the position of the pen instrument 6 on book page 7 to digitaly coded location data recorded in the animation.

Referring to FIG. 2, the drawing shows a book 2 with printed typography, graphics, or illustrations on pages 7, that is bound with a binding 20 which allows the pages 7 to lay in a vertical stack, each page directly over or under each other. The pages 7 may swivel to the back of the book 2 and thus allow any page to be positioned as the top page. At the top corners of the pages 7 circular holes are punched in the same positions for each page 7. When the pages are stacked vertically, as shown, cavities 11 and 12 are formed that accept protruding pegs 13 and 14 when the half-frame instrument 3 is placed by the student over pages 7 as indicated in FIG. 3. Accordingly, the strip microphones 8 and 10 installed in the mutually perpendicular frame sides of frame 3 are positioned in a registered position relative the top page 7 as shown in FIG. 3. A handle 9 is grasped by the student when positioning frame 3 and pegs 13 and 14 into cavities 11 and 12 over pages 7. The student places a transducer 5 installed in the tip of pen 6 to the surface of pages 7 and by this process activates a switch indicating contact and duration of contact to the system which functions as previously described. Alternatively, the transducer 5 is installed in the fingertip of a glove worn by the user or student and the selected page 7 position identified to the system by bringing the glove fingertip into close proximity or touching the selected location on the page 7.

The embodiment illustrated in FIGS. 2 and 3 incorporates pen 6 and frame 3 wired 191 and 181, respectively, to the circuit of FIG. 1. As an alternative a remote control embodiment of pen 6 and frame 3 eliminates wiring 181 and 191 to pen 6. Pen 6 and frame 3 incorporate battery driven modules with crystal controlled synchronized time bases. Pen module 6 incorporates an ultrasonic oscillator producing pulses, and frame module 3 incorproates a radio transmitter sending the pulse data from microphone 8 and 9 to a receiver in the remote input circuits 61 via antenna 63 in the circuit as shown in FIG. 1.

Figure 4:
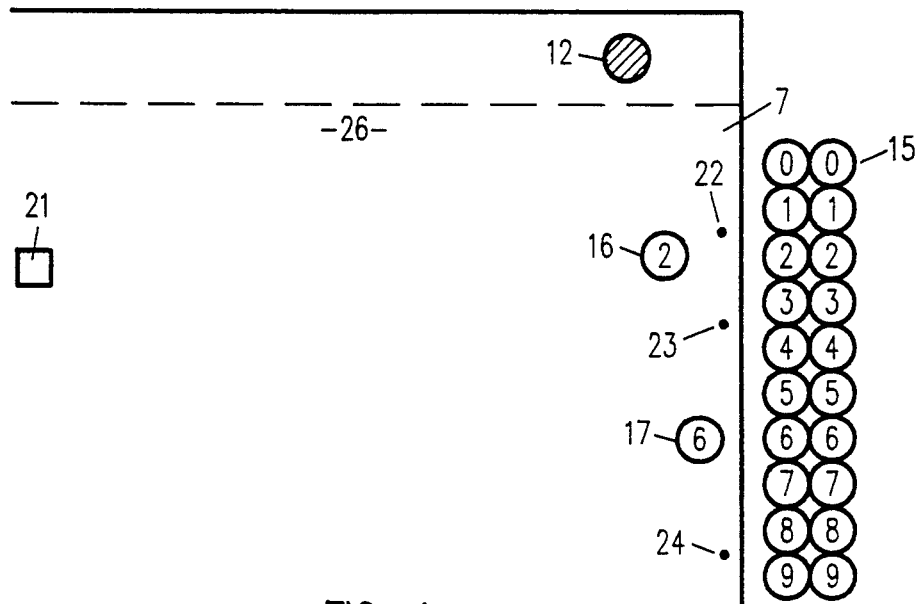
FIG. 4 is a plan view of a page from the book of FIG. 2 illustrating a page number and video track preference coding system.

The means of identifying the book page 7 number to the invention system are displayed in FIG. 4. A keyboard 15 comprises number locations stored in the system memory and allocated to an area on page 7, but not printed. The page number digit area is printed on the page as indicated in area 16 for digit 2, the first digit number of the page, in this case "26". The second number is located in area 17 for digit 6. The student touches pen tip 5 to areas 16 and 17 to register "26" to the system. An alternative miniature version of the above reduces the keyboard 15 to a configuration of dots, the applicable dots of which are printed on the page border as indicated by 22, 23, and 24 to register positions in recorded miniature keyboards of the page numbers. The miniature keyboards are enlarged to identify the book to the system. The student touches pen tip 5 to these dots 22, 23, and 24.

The invention provides multiple animation responses to a single indicated page 7 position, or chain of positions. The student selects the type of response from a listing of responses printed on the page 7. Each listing may be preceded by an outlined area which may be a square 21 as shown in FIG. 4. Such areas 21 may be interspersed in sentences of the text to register a selected type of response. The student touches area 21 with pen tip 6 to select.

Multiple tracks of animation are produced as responses for the subject matter of the printed pages 7. The animated data can also include sound track data to provide a verbal description associated with the printed matter on the page 7 at the selected positions. The sound track data may also provide background sound such as music associated with selected page positions, either in addition to descriptive matter or instead of. In one embodiment, the video portion of the animated tracks may be disabled or animation tracks providing only sound track data may be utilized to provide audio animation and description only of the printed matter at the selected page position. This animation production is timed and scheduled for frame exposure by the animator on an exposure sheet. The page location coordinates of areas effecting response when touched by transducer 5 of pen 6 are calculated on the exposure sheet to be coded into the finished animation production at the start of every scene. The said coordinates are based on the measurement of the standard field which is 8.75 inches high and 12 inches wide. The embodiment shown in FIGS. 2 and 3 turns this standard field into a field 12 inches high and 8.75 inches wide. A reduction in said 12/8.75 ratio may be made, as to a printed page area of 9.6 inches high and 7 inches wide, which fits a page 11 inches high and 8.5 inches wide, the typewriter paper size. Accordingly, the animator's coded field location coordinates would be calculated as percentages of the field height and width from half-frame 3. Thus the center of the printed field would be 50% South and 50% East. An alternate embodiment of book 2 and frame 3 reverses the height and width measurement, and conforms to the standard animation field.

In addition to the response described above by camera-originated tracks of full animation, the invention provides other means of response using pre-recorded digital animation as described in the functions of the secondary circuit and voice response from a vocoder or similar chip to generate voice (analog signals) from digital code, computer digital animation generated at the time, and pre-recorded and generated animation at the same time. Each of the above means for esponse has a distinct use and advantage.

Figure 5:
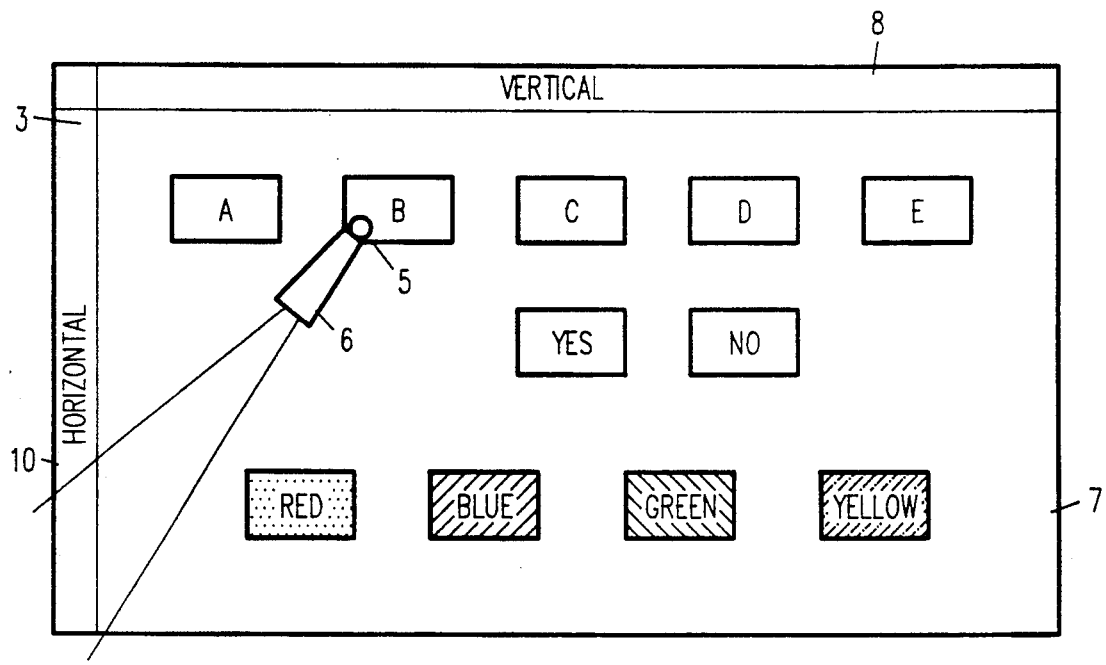
FIG. 5 is schematic diagram of a page of the workbook shown in FIGS. 2 and 3 on which is printed a number of symbols representing key pads at predetermined locations.

The student has the ability to operate the system by touching keys of a keyboard printed on the book page. Referring also to FIGS. 1 and 5, there is shown a number of locations preprinted on page 7 within the area bounded by frame 3 representing keyboard pads. The pad locations are coded and input to the system from tape or disk 11, or from cartridge 26. The student positions pen indicator 6 in close proximity to or touches the page contacting the surface on one of the pads, pad B for example, with pen point 5. This indication together with the horizontal 10 and vertical 8 sensors allows the system to register the key stroke as pad B in the multiple choices of pad A through pad E. Alternative, the user could answer YES or No. For a person that does not read, keypads can be color coded as shown. The ability to touch keypads on the printed keyboard to effect the proper response in a typewriter or desk-top computer and printer is provided by utilizing indicating pen or instrument 6 with the printed representation of an entire keyboard. Pen point 5 contact determines the page 7 coordinates of the key pad touched which are matched to a coded table of values for all the key pad positions to effect a digital command to an associated desk top computer which preferably matches the same digital data generated by the computer keyboard keys when touched to initiate the corresponding computer display or printer action.

A typewriter or computer keyboard printed in an instruction book may be touched to control a computer, a printer, and the TV monitor display of the system according to the keys touched. An illustration of a musical instrument keyboard, as a piano, may be touched to play the sound of the keys and display the notes on a musical scale. Touching a note in a musical scale printed on the book page plays the sound of the note and displays the corresponding key being touched on a piano or formed by the hands on a guitar or other instrument. Musical symbols are related to sounds, and music is related to symbols. Touching the letters of the unknown word in a reading primer with pen 6, the illiterate or child hears the sounds of the word, the whole word sound, the visible appearance of the human mouth in action, as each sound and word is spoken and pronounced in synchronization with the position of the transducer 5. Handwriting of the printed word is written in synchronization with the sound and animated formation of the printed letters. Thus the child learns to associate the unknown printed letter symbols and the handwriting thereof with his spoken vocabulary and the formation of words with his mouth towards learning to read, write, and pronounce. A single letter or word may be touched repeatedly by the transducer 5 to afford the beginner an exploration of all the elements of the unknown printed word on his own terms, or comprehension. Foreign words and sentences as printed in the book are pronounced with English translation as the English equivalent is animated on the screen with actions and pictures of the meaning according to the placement of pen 6 on page 7. And, thus English printed words may be translated to a foreign language. Multiple animations may explain and depict multiple analyses of a single sentence. Accordingly, the student may choose, by touching a printed key space on the page, to hear the sentence pronounced as the animation depicts the letters building into words, to hear each sound pronounced and combined into each word, to have the sentence meaning explained, to have a single word defined as a dictionary, to have the grammer of the sentence analyzed, to have the sentence translated to another language, or to have the meaning of a paragraph explained and illustrated in action. A keyboard table of speech sound letters arranged according to the science of phonetics may be touched by the student with pen 6 to teach the letter symbols according to the manner and place of their related sound formation. By touching the known word sounds as (w-u-n-s) both the sounds of the word,(wuns), and the irregular spelling, "once", may appear on the monitor with audio. Maps and charts are animated when touched by pen 6. Details of geography are explained on the television monitor when indicated by the touch of pen 6 to a printed map. The movement and action of electricity in circuit diagrams is animated and explained in each detail that is indicated by the student. The details of instruction manuals are converted to animated actions that may be speeded or slowed, or branch to multiple other actions during continuous action. Perspectives of graphics may change in animation, and objects may change to other objects in an animated metamorphosis. Thus the invention builds in the printed word or picture all the features of the art of animation, the computer, the printer, and the television, to be activated by the student, by himself, as he touches the book page 7 with pen 6.

While the preferred embodiment of the book 2 shown in FIGS. 2, 3 and 4 is described as incorporating both video and audio, an alternate embodiment of the book system using audio alone may be used to teach effectively. Touching unknown printed words that are in his speaking vocabulary and shown in a book 2, the beginner or illiterate hears the sounds of the printed word symbols and thus is able to break the sound/symbol code. The alternate embodiment uses a coded audio tape or disk, and the system operates otherwise as herein described.

A workbook embodiment of the above book invention provides different modes. In one mode the student answers questions in the workbook pertaining to the animation display on the monitor. The animation display may then offer an instructive response to the student's answers. In another mode the student watches the monitor and makes inputs to the workbook in response to monitor questions by positioning the pen indicator to locations on the workbook printed matter of text, charts, graphics, illustrations, diagrams, or any form of printed imagery. The system may then switch to multiple tracks of animation in response to the indications on the workbook by the student. In a combination of the above modes the student responds to workbook questions by activating a video display response and responds to monitor questions in the workbook. Audio stimuli is also used that is appropriate to augment the visual to enrich the instruction or simulation or realism.

The student working at a workbook 2 using a pointer 6 to indicate positions on the page 7 is able to graphically define the display shown on the monitor 24 in multiple modes. Assuming a student is studying the circuit of FIG. 1 which is printed on a workbook page 7, by touching logic circuitry 21 with the indicator pen 6, the student has graphically defined and effected a video display showing and explaining the animated details of flow charts, circuits, and function of logic circuitry 21. The student may, also, define the type of analysis by touching squares 21 printed on the workbook page 7 at preselected locations with descriptive graphics and text of the types of video/audio response. The coordinates of the location of square 21 on the page 7 constitute a code which is also coded in the animation production or supplied by program memory cartridge 26 for access from memory storage RAM 51 to be compared to said digital coordinates determined by the student graphical input terminal and from counters 14-16 of FIG. 1. In other modes involving the definition of action and the timing thereof, the student may indicate verbs whose meaning is animated in action on the display. Indicating the printed verb "run" defines the displayed run action. The handwriting of script writing is animated in the proper pen progression to teach the student how to write. The script forms in synchronization with the student's indicating the definition of a printed word and accompanying audio. Or, as the student touches the notes of music printed in bars on page 7, as the notes are being played and visually performed on the video monitor 24, the timing and accuracy of the student's indications may be graded for synchronization by data sent by cuing unit 53 to computer 58 and printer 59 for processing. In another mode the student touches the printed text, graph, diagram, chart, keyboard of answers, or illustration preprinted on page 7 that is related to the subject being discussed or displayed on monitor 24. Then, the accuracy, timing synchronization, and action of the student's indications are scored and graded from data sent by cuing unit 53 to computer 58.

The embodiment may be used for training or games in addition to the testing and workbook uses. The system provides means determining the meaning of the student response, evaluating the student performance, timing the response, and recording such findings. The performance evaluation results output may be transmitted by the computer 58 to an instructor at a remote or central location via output terminal 60.

Several modes of operation involve scoring. First, the student's response can be used to determine the next action in self-paced learning. Second, examinations can be given and graded following a learning experience. Both require comparison of the user's response with a stored correct answer. In working with the book 2 and monitor 24, a variety of input options would be available, including multiple choice and keyboard responses. The correct response would come from an input via Program Memory Cartridge 26, Video Tape 11, or Graphics Generator 57. The coordinates of the correct (and allowed wrong) locations are stored in RAM 55, and the computer 58 would compare the response to the allowed locations to determine if a response is right or wrong. If a number or alphabetical response is permitted as an answer, the user would use a printed keyboard in the workbook 2 to indicate the response. The user's response can be used to either control the sequence of actions or generate a grade based on performance. The results may be printed on printer 59 or sent to an instructor by computer 58. Performance evaluation could also be based on time taken to respond. At the start (turning a page, for example) the time from clock 23 can be stored in a register in computer 58. When a response is received, the time taken is readily available by subtracting the register value from the current time from clock 23 (i.e., an electronic stop watch).

Figure 6:
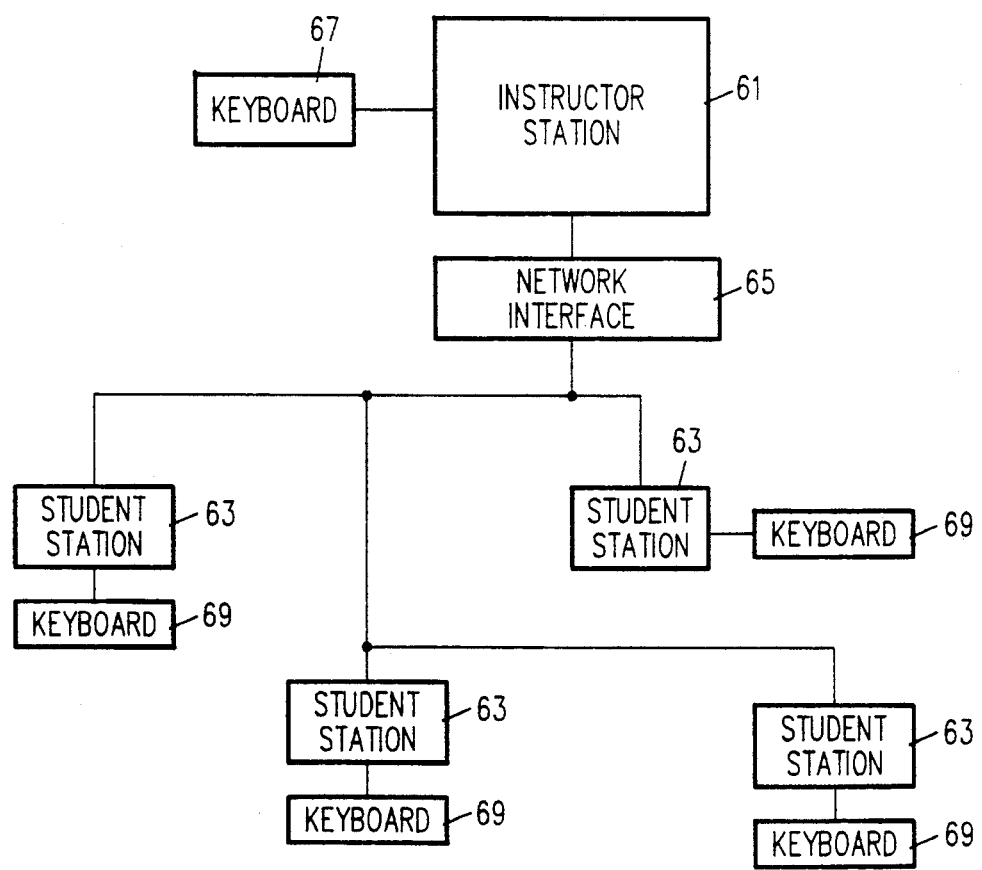
FIG. 6 is a conceptual block diagram illustrating the networking of instructor and student workstations in a multiplexed system constructed in accordance with the present invention.

Referring now also to FIG. 6, a plurality of monitors 24 and workbook embodiments as described above may be operated in a multiplexed mode with a master monitor and workbook to allow an instructor to serve a number of students with considerable economy. FIG. 6 shows a conceptual block diagram of a networked system providing a master or instructor station 61 multiplexed with a number of slave or student stations 63 via network interface circuitry 65. The instructor station 61 comprises the system shown in FIG. 1 including a terminal or keyboard 67 to allow an instructor to provide input commands and other instructions to the system. The instructor station is coupled to the network interface circuitry 65 via the system output terminal 60. Each of the student stations 63 comprises a remote monitor and workbook system (as described with FIGS. 2-5) coupled back to the instructor station 61 and the system via the network interface 65. In addition to the indicator pen 6, each student station 63 may also comprise a terminal or keyboard 69 to provide alternate input means. The instructor station monitor can be switched between individual student stations 63 to allow an instructor to interface with or monitor any student individually, a selected group or all of the students simultaneously.

The instructor utilizes the indicator pen 6 to write, or drag or otherwise mark on the pages 7 of the workbook 2 as a blackboard. The instructor utilizes keyboard 67 or other means to select on which student's or students' monitor the blackboard display would be displayed. Student inputs and responses light displays on the master terminal or monitor to indicate to the instructor that a student responses is waiting for the instructor attention. Selection of the particular student station displays the student's notes or other response on the instructor monitor. In a multiplexed mode, the instructor's input via the pen 6 and workbook 2 and/or selected animated displays associated with selected page 7 locations are simultaneously displayed on all of the student station 63 monitors. Student responses comprising animated displays provided by selected ones of multiple tracks of animation data associated with student indicated page 7 locations are displayed on the student monitor when selected by the instructor. The master/slave system may be implemented locally, or the student stations may be remote from the instructor station.

Referring to FIG. 1, the instructor uses the pen instrument 6 to write or draw graphics on book page 7. The pen 6 includes a writing tip 5. Described means for producing digital signals representative of the two coordinates of the location of pen tip 5 on the surface of book page 7 produce a chain of such position coordinates for the writing or drawing by said pen tip 5. In a well known manner, this digital representation is then used as an address in a RAM organized in a raster representation of the screen of the monitor. This is read out by a scanning system for a line at a time to produce the video signal driving the monitor in a conventional manner. The instructor's writing may thus appear on a solid color or blank monitor screen, on an operating animation display, or on a still video reproduction as of the printed type or graphics on the pages 7 of said book or workbook.

Figure 7:
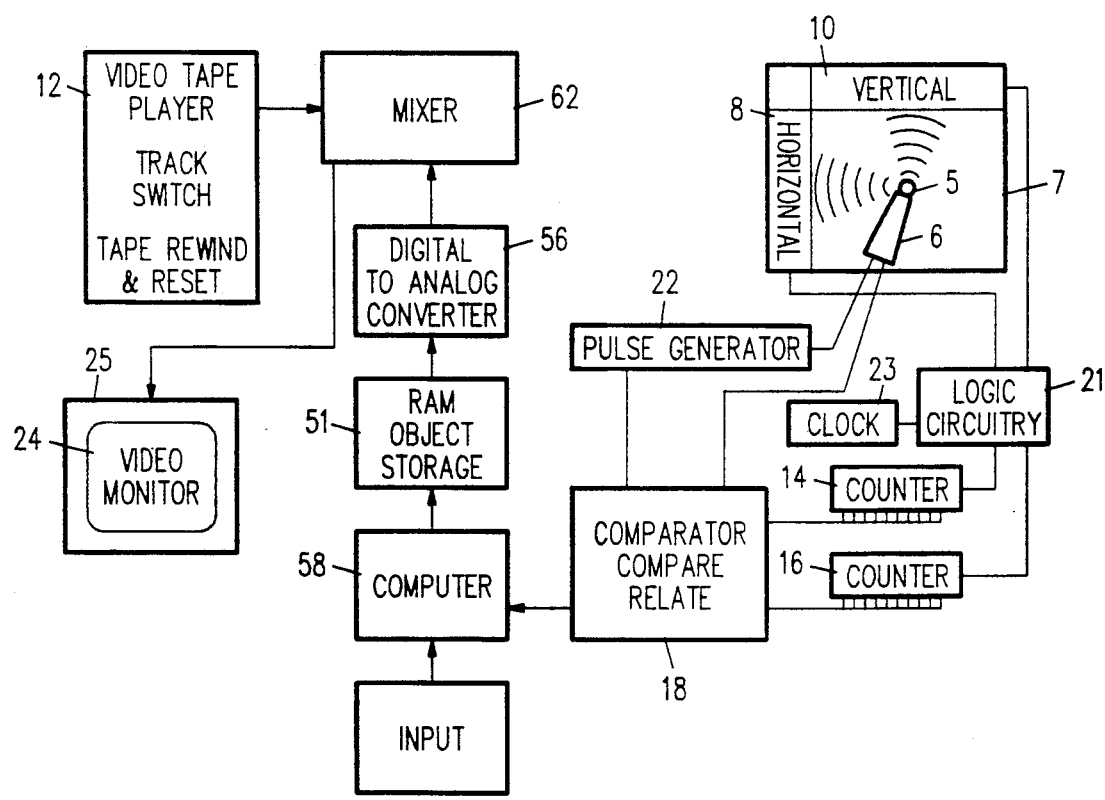
FIG. 7 is a functional block diagram of an alternate circuit implementing the systems shown in FIGS. 3, 4 and 5.

Referring now also to FIG. 7, a functional block diagram of a circuit in accordance with the present invention is shown which provides the capability to input video display data via the indicator pen 6 in combination with the page 7 and book frame 3 for display either alone or in combination with animated display data. A normal video signal from multiple sources, for example, video tape player 12 is coupled to monitor 25 via a mixer 62. This signal would be in some standard format such as NTSC (National Television Standards Committee). To write with or overwrite display graphics, or indicate a pointer or cursor in combination with the animated display, a second user input video signal input via indicator pen 6 and strip microphones 8 and 10 is combined with the normal signal in the mixer 62. This could be combined in at least three modes as determined by a control signal and the mixer 62 as follows: show normal video only; i.e., prerecorded or stored animation; show user input video only; show both signal combined; and show digital (foreground) superimposed over the animated display; the animated display may or may not be deleted in regions where the user input video image is displayed. The user input video image signal is generated by the user in digital form and coupled to mixer 62 via digital-to-analog convertor (DAC) 56. A graphical input terminal as shown in FIG. 7 comprising a surface 7 corresponding to a page 7, a writing instrument or pen 6 data responsive to movements of the writing pen 6 at the surface 7 representing the location of pen 6 coupled to computer 58. The writing instrument 6 includes a transducer at the writing tip 5 and a felt marker, pencil lead, or the like. Instrument 6 also includes an internal switch which indicates whether or not the writing tip 5 is in contact with the surface 7. The computer 58 generates command signals representing the coordinate data for the writing instrument 6 referenced to the surface or page 7 boundaries accessing raster data stored in RAM 51. A digital video image is generated by RAM 51 and coupled to DAC 56 to provide an analog video signal to mixer 62. As previously described, strip microphones 8 and 10 are responsive to the ultrasonic pulses produced by writing instrument 6. Microphones 8 and 10, clock 23, counters 14 and 16, and logic circuitry 21 measure the time delay for airborne propagation of pulse from transducer 5 to microphones 8 and 10 to provide the raw coordinate data to the computer 58. Alternatively a mouse may be used inputting data directly to the computer 58.

Figure 8:
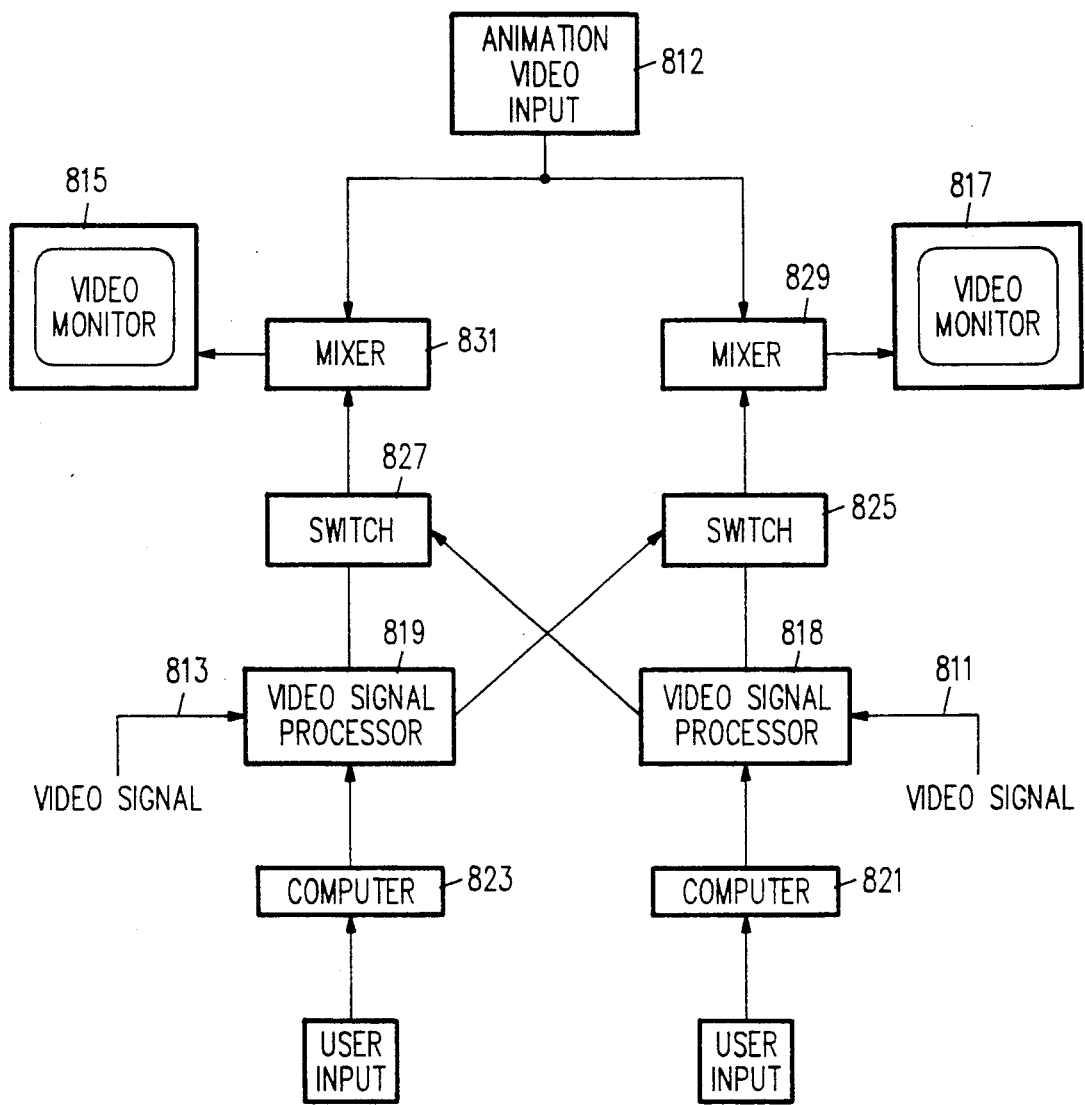
FIG. 8 is a functional block diagram implementing the instructor and student networked workstation system shown in FIG. 6.

Referring now also to FIG. 8, a functional block diagram of an alternative circuit to that shown in FIG. 7 implementing the master/slave system shown in FIG. 6 is provided. A synthesized video signal derived from user inputs via indicating instrument 6, synthesized by the secondary circuit shown in FIG. 1 and output from the DAC 56, for example, is coupled to a video signal processor 818, 819 on line 811, 813, respectively, for an individual station. Additional user input generated by computer 821, 823 is combined with the video signal on lines 811, 813, respectively, and coupled via switching controllers 825, 827 to the appropriate station mixer circuits 829, 831 where it is combined with selected animated video from an animation video input 812 such as the video tape player 12 or plug-in cartridge 26 of FIG. 1. The combined video signal is coupled to the station display monitor 815, 817. Any number of stations may be added on to the system thus providing a networked system in which any stations may be coupled to one or more of the other stations on the network. Utilizing switching circuits 825, 827 which also perform multiplexing functions provide the capability for a master station to control displays on all other stations simultaneously.

Figure 9:
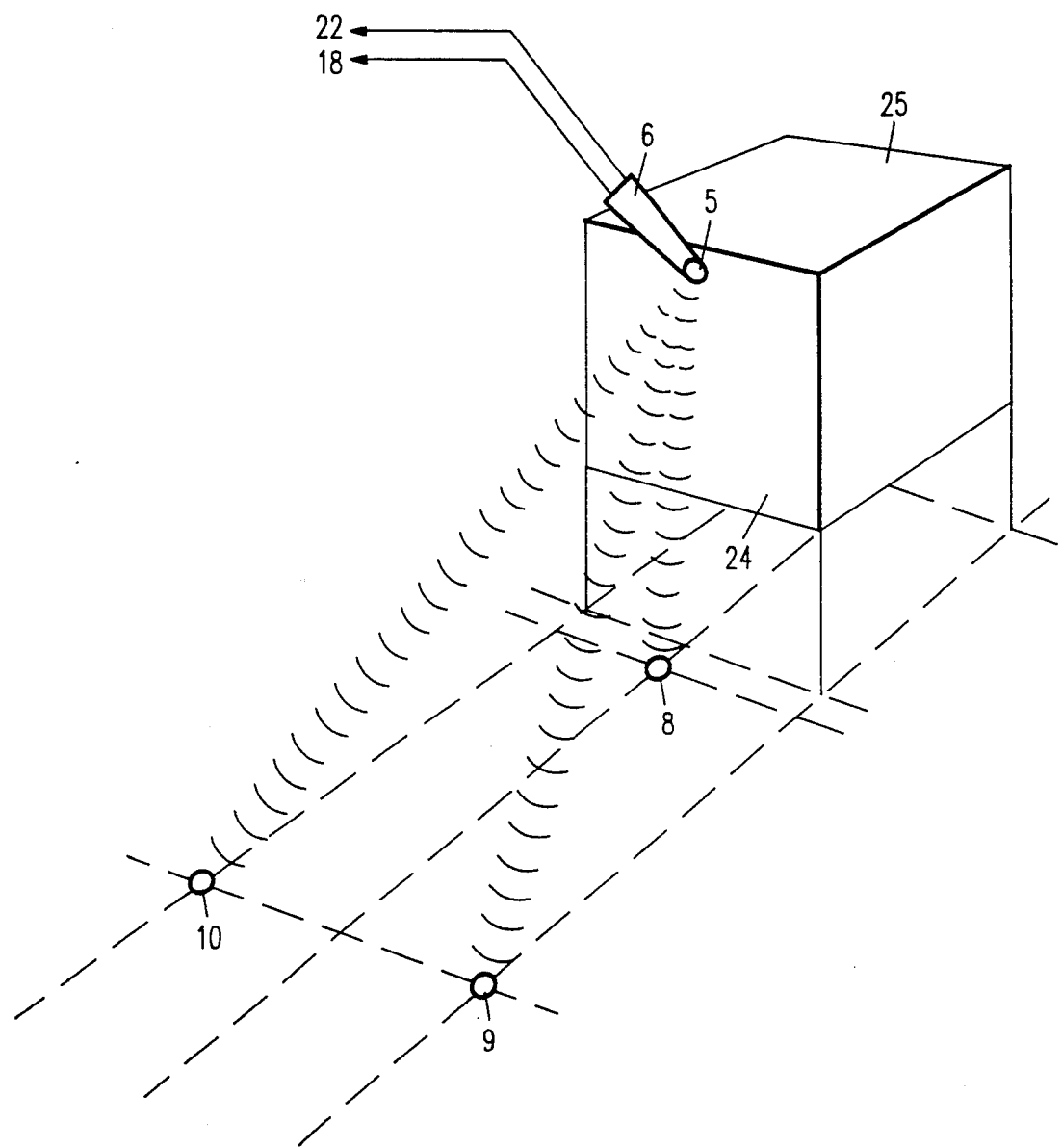
FIG. 9 is a diagram in perspective showing the placement of discrete point microphones in a triangular array with a transducer incorporated in a hand-held indicating pen about a 3-dimensional study object illustrating another embodiment of the present invention.

Referring now also to FIG. 9, an alternate embodiment in accordance with the present invention utilizes a 3-dimensional solid object which may be any form of mechanism or sculpture and is shown as cube 25. One or more arrays comprising three point or discrete microphones 8, 9 and 10 are positioned at angles around said solid object study 25 sufficient to encompass the surface area and enable a student to study any point on the object 25 as described in the above book embodiment. For example, the study object 25 may represent a globe of the earth with the 3-dimensional coordinates of selected points or the globe associated with animated video display and sound tracks providing information concerning the country or region surrounding the selected point. An alternate embodiment provides for rotation of the study object 25 to registered fixed positions, thereby requiring only one array of three discrete microphones as shown in FIG. 9. Each fixed stop position for the study object has a separate table of location values defined. FIG. 9 illustrates an installation of single discrete point microphones 8, 9, and 10 before side 24 of object 25. The student indicates the point on the study object 25 to be studied with indicator 6, as the point indicator pen 6 tip 5 touches the side of object 24.

Figure 10:
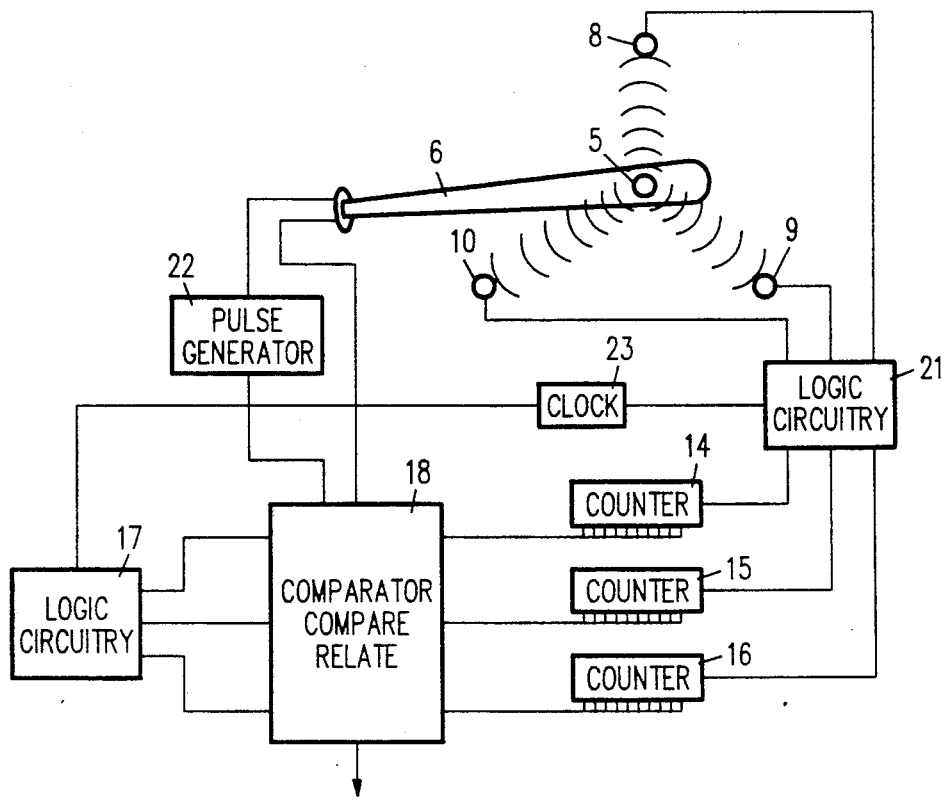
FIG. 10 is a functional block diagram of an alternative circuit of FIG. 1 implementing the system shown in FIG. 9.

Referring now also to FIG. 10, a functional block diagram shows circuitry which replaces the similar circuits and apparatus of FIG. 1. Using the three triangular formation variable measurements of microphone 10 to 8, 5 to 9, and 5 to 10, 3-dimensional location coordinates of the points on object 25 touched by indicator instrument 6 are determined and interactively related to the animation displayed on the monitor 25. A keyboard module comprising the player input control section 29 (as shown in FIG. 1) is used by the student to select the category of animation response. The uses include training and simulation systems. The solid objects studied may be machinery, motor vehicles, globe maps, weaponry, medical physiology models, taxidermy, instruments, tools, farm equipment, and the interior circuitry of electronic devices as televisions and computers. The animation may display a cross-section of the interior action of such studies as a human heart or automobile caburetor. Multiple objects may be studied as a plurality of mounted, connected, or associated objects. The student may repeatedly review animated instruction according to his own comprehension development. The embodiment creates another dimension of multiple animated action analysis for the classroom, sales display, vocational training, or any other form of studied object education. An alternate embodiment of indicating instrument 6 would be a glove with a transducer 5 installed at the index finger tip and may use portable module circuitry, crystal-timed with a power source.

Referring now again to FIG. 1, the system shown includes computer 58 coupled to printer 59. The computer 58 is coupled to the host system via the host processor 19, the retrieval unit 52, the curing unit 53 and RAM 55. The computer 58 receives and processes commands and other information and provides system commands to the host processor and system output to the printer 59 and to the system output terminal 60 via the cuing unit 53. The computer 58 also responds to user inputs via the player input control block 29 and the host processor 19. Printer 59 produces graphics or typing according to the contact of the pen transducer 6 to the printed computer or typewriter keyboards described in the above book embodiment. Many types, sizes configurations, and colors of keyboards printed in the said book may operate the computer 58 and printer 59 when the keyboards are touched by said pen 6. Or, printed type describing computer functions may activate the function described of the computer when the type is touched by said pen 6.

Computer programs controlled by simple descriptive keyboards or graphics as described may be operated by a layman without any knowledge of a computer operational language such as MS DOS. Accordingly, the invention allows the beginner or layman to do everything a computer user needs to do without getting into the technical aspects of computer operation. Computer program software is incorporated in the book keyboard embodiment process allowing the layman to concentrate on computer function concepts presented by multiple types of keyboards as described. The layman may use a plurality of keyboards during a single computer function. Other functions of the computer may operate using graphic symbols as a keyboard. Flow charts may serve as computer keyboards. Thus the invention simplifies using a computer by enabling the layman to operate a computer without using the standard keyboard and computer program software directly. But, the layman does use the standard keyboard and the various accessory program software indirectly.

Further, multiple tracks of animation may elaborate and explain said printed keyboards to the layman in every detail that the layman indicates in said book with said pen. Such animated response would be separated from the above described computer response.

Figure 11:
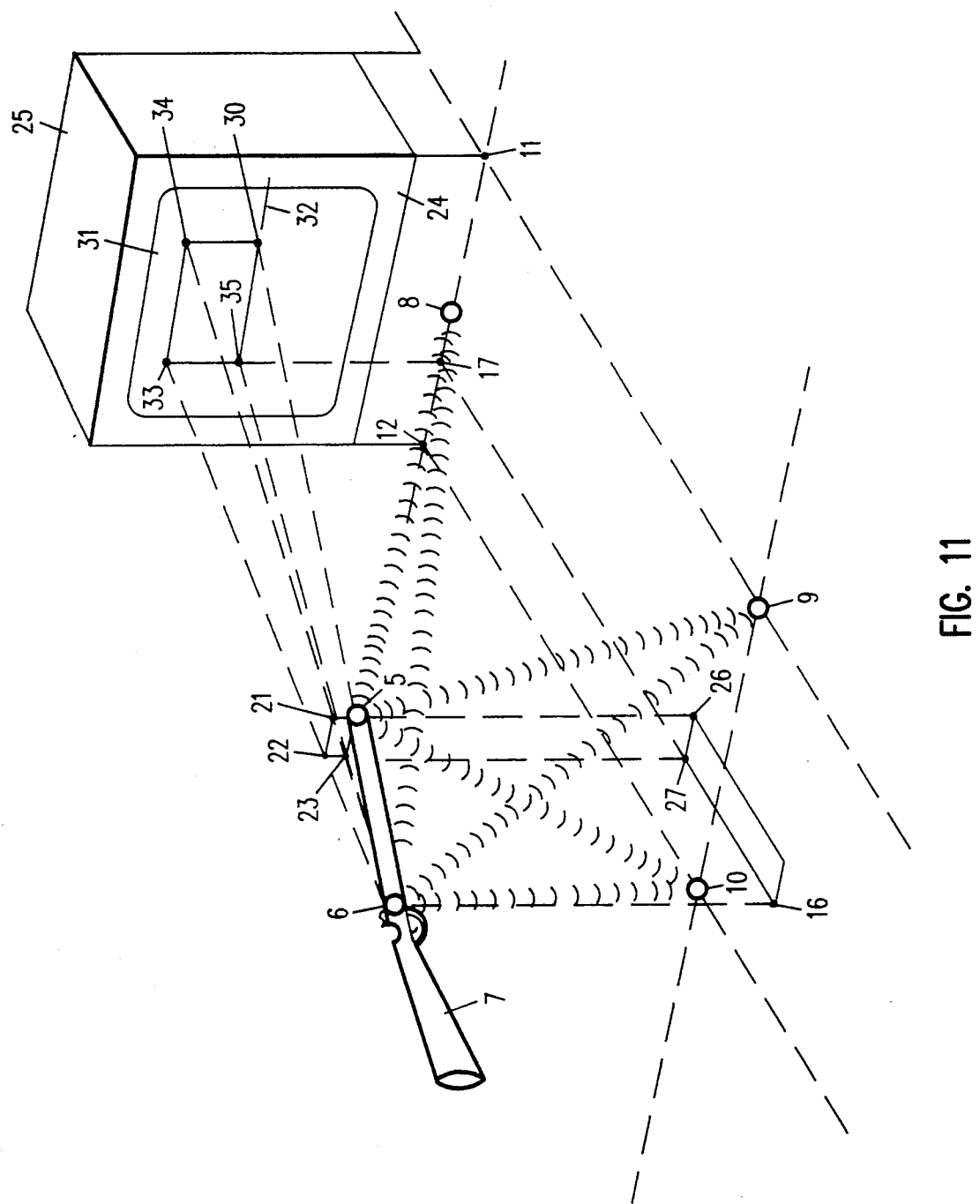
FIG. 11 is a diagram in perspective showing the placement of discrete point microphones in a pyramid array with sonic tranducers installed in a rifle simulation before a video monitor illustrating another embodiment of the present invention.

Referring to FIG. 11, there is shown a drawing of a simulated rifle aimed at the face of a video monitor 24, or at a motion picture projection screen. When the rifle is aimed and triggered the invention calculates the precise point on the video monitor 24, or projection screen, whereto the rifle barrel 6 to 5 is aimed. Accordingly, the rifle embodiment is unique by instantly producing the coordinates of the point of aim on the screen. The usual firing of a missile, emission of light rays, or the manipulation of video monitor circuitry to effect a sliding cursor into the target all become extraneous and not intrinsic to the simulation process. Thus the gun embodiment may be used on large projection screens and incorporate large weaponry. The use of large projection screens also heightens the sense of reality by enlarging the target area. Transducers 6 and 5 working with point microphones 8, 9 and 10 permit the accurate determination of position and aiming direction of the rifle 7 relative to the screen 24. The calculation of the aiming spot may be done using various sytems. The rifle may be aimed at specific points on the screen in the set-up mode to implement the initial condition measurements. Using rectangular coordinates, the positions may be calculated by ratios. As an example, Distance 33-31 is equal to Distance 22-21 multiplied by the ratio of Distance 6-33 to Distance 6-22. The various ratios may be organized to use only the directly measured values converted into their vertical and horizontal components. If the rifle 7 is fixed relative to the screen, these ratios may be fixed and the computation simplified by storing the pre-calculated fixed terms. (Calculation can avoid division and use faster multiplication if instead of dividing by some number, its reciprocal is calculated, stored, and used as a multiplier.)

In this manner, all the other required distances to locate the aiming spot on the screen 24 can be calculated. Accordingly, there are improved elegant methods that use less computer power that are an advance of the simple geometric method as follows: Ultransonic trandsucers 6 and 5 are installed at the extremities of the rifle barrel at the sighting position 6 and at the point of the rifle barrel 5. These transducers alternatingly emit impulses to the point microphones 8, 9, and 10 which are installed at equal distances from the base points 11 and 12 of monitor 25 on lines at right angles to said base line 11-12 and at the center of base line 11-12. A readout of said impulses by microphones 8, 9, 10 establishes the coordinates of transducers 6 and 5. The vertical elevation line of transducer 6 to floor point 16 is calculated for length and position of floor point 16. The length of line 16-17, intersecting base line 11-12 at right angles, is calculated to obtain the length of comparable parallel line 6 to 33. The vertical elevation line of transducer 5 to floor point 26 is calculated for length and position of floor point 2, 6. The vertical difference of point 6 to point 5 establishes point 21. The distance from transducer 5 vertical line base 26 to transducer 6 vertical elevation line base 16 to 17 line is calculated to obtain comparable parallel distance 5 to 23. The distance of 6 to 21 is calculated from the right angle triangle 6-5-21 using the known measurements of 6 to 5 and 5 to 21. The known distance 6 to 21 using the known measurements of 6 to 5 and 5 to 21. The known distance 6 to 21 is, then, used with the known distance 21 to 22 in the right angle triangle 6-21-22 to establish the distance of 6 to 22. The distance of 6 to 33 is divided by the distance of 6 to 22, and the resulting divisor is multiplied by the distance 21 to 22 to establish the distance 33 to 31. The said divisor, is then, multiplied by the distance of 22 to 23 to establish the distance of 33 to 35. The point on the video monitor screen 24, or projection screen, at which the rifle 7 is aimed is established by a vertical measurement of the known 33 to 35 distance to point 30, and the horizontal measurement of the known 33 to 31 distance to point 30. Said aimed "hit" position 30 is then compared to the target position of the animated object of character displayed by the video monitor 25 and digitally coded into the video tape or disc. The course of the animation is then changed according to the accuracy of the rifleman. The animation, if "hit", reacts with sound during continuous action. Other animation embodiments may include target scoring, instruction, or game graphics. The rifle simulation effect is enhanced by mechanical spring or electronic means causing the rifle to "kick" on being triggered to a degree simulating reality.

Figure 12:
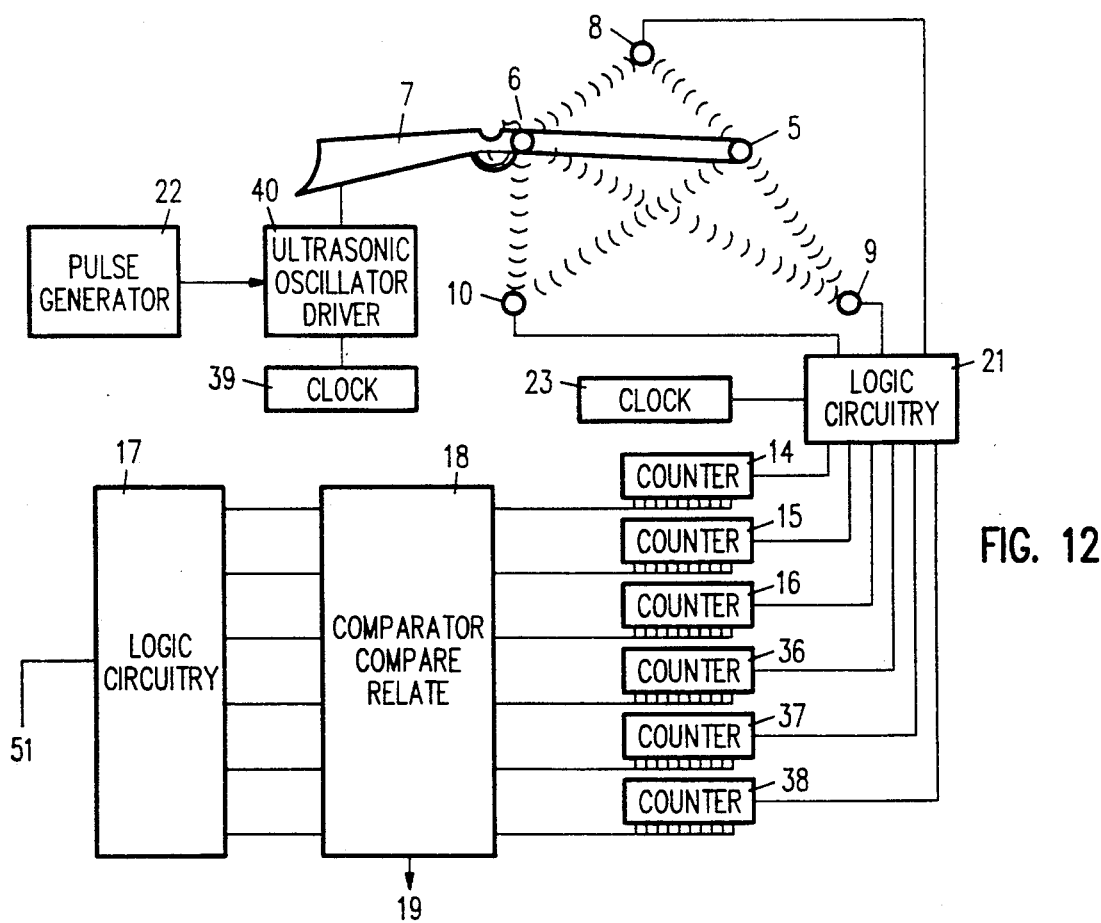
FIG. 12 is a functional block diagram of an alternate circuit of FIG. 1 implementing the system shown in FIG. 11.

Referring now also to FIG. 12, a functional block diagram of the rifle embodiment circuit which may be incorporated in the system double circuit of FIG. 1 is shown. The rifle 7 is a portable battery operated ultrasonic generator module. The generator module includes ultrasonic transducers 5 and 6 for emitting ultrasonic pulses. The transducers are driven by an ultrasonic oscillator keyed to produce pulses of ultrasonic energy at a fixed repetitive rate. A crystal controlled time base synchronizes the frequency, pulse width, and repetitive rate of the pulses. Transducers 5 and 6 each produce a pulse signal differing in pulse width and frequency. Accordingly rifle module 7 produces alternating pulses of two different types, one type emitted by transducer 5, and another type emitted by transducer 6. Point microphones 8, 9, and 10 detect the ultrasonic energy emitted by generator module rifle 7. Logic circuitry 21 recognizes the designation of each alternating type pulse by the pulse width and frequency. Accordingly, logic circuitry 21 divides the three pulses of the microphones 8, 9, and 10 to become six pulse signals to measure the three coordinates from each transducer 5 and 6. Counters 14, 15, 16, 36, 37, 38 convert the pulse data to digital form to be compared by comparator 18 to digitally coded animation location data.

A stereo visual perception embodiment of the present invention extends the scope and effectiveness of the inventions and embodiments thereof described hereinabove and in the referenced U.S. patents related to animation interactively controlled by the viewer. Although foreshortened perspective animation admirably propjects an image to a mid-air position before the monitor or projection screen, and although the speed of such projection renders such projected images undiscernible in animation, as they are in reality, a hundred miles per hour for a baseball pitcher's serve, a stereo visual perception process embodiment of the present invention provides slow moving objects and permanent three dimension projections before the screen to appear to the operator, or player, as reality, and thus heighten the simulation illusion. The preferred current three dimensions (3-D) image scheme uses two pictures sent in alternating fields of a video (TV) signal. The viewer, or player, uses a pair of glasses with electric crystal "shutters" that allows only one eye to see at a time. The regular video (TV) picture is sent at 60 frames a second with alternating frames showing alternating lines (interlaced). Thus a half of the picture is sent in 1/60th of a second and complete pictures at 1/30th a second. By going to a higher signal bandwidth, the 3-D system sends one picture for one eye with no interlace in 1/160th of a second and both eyes see a complete 3-D picture 30 times a second.

Figure 23:
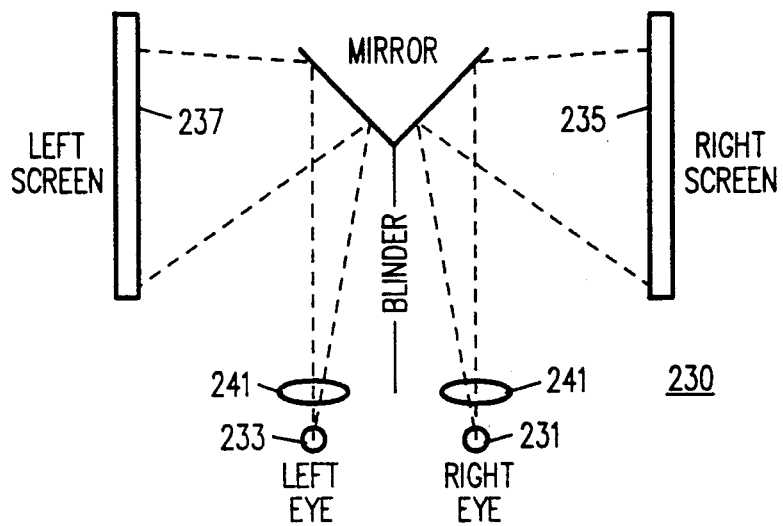
FIG. 23 diagrams a mirror and lens system to display pictures in three dimensions.
Figure 24:
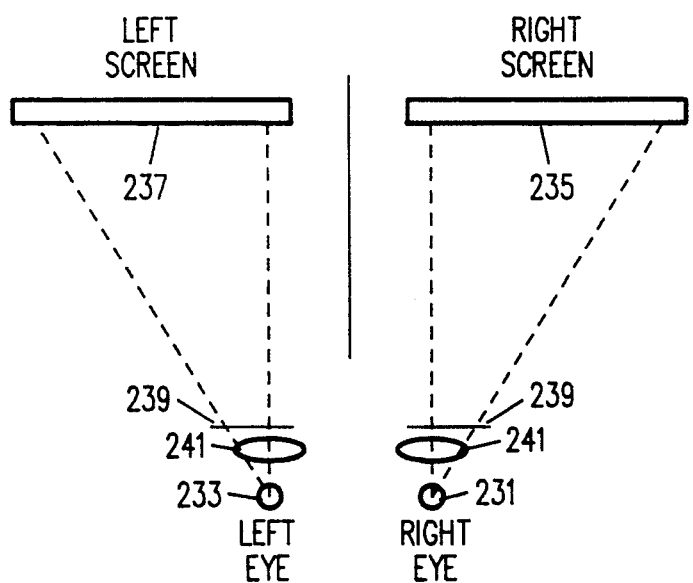
FIG. 24 diagrams an equivalent to system diagrammed in FIG. 23.

There are many ways to display and view three-dimensional video. FIG. 23 shows a mirror and lens system 230 arranged to give separate views for each eye 231, 233. If properly adjusted with visual images 235, 237 for each eye 231, 233, respectively, that are different perspective, the human brain believes the scene shown in the images in three-dimensional. The equivalent apparatus arrangement is shown in FIG. 24. The images 235, 237 can be taken with a camera that is shifted to the eye positions in an arrangement like FIG. 24 or the images can be computed or drawn by the animator. FIG. 24 works with filters 239 as shown with the optical paths including separate lenses 241 separated for the two eyes 231, 233. If the left eye image 237 is green and the left filter green while the right eye image 235 and filter for the right eye 231 are red, the two images 235, 237 can be projected overlapped on the screen and yet seen separately.

Figure 25:
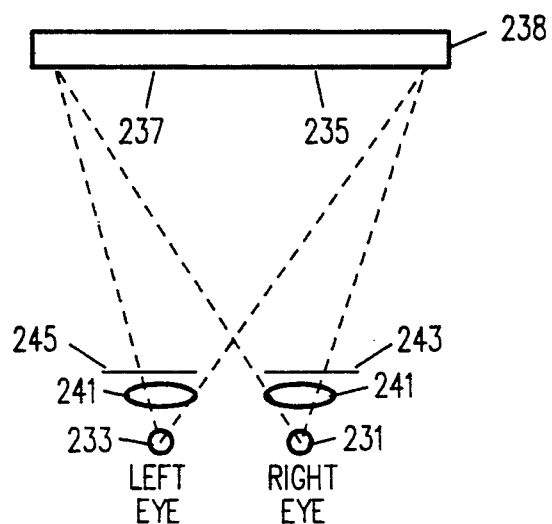
FIG. 25 diagrams a three dimension viewing system using overlapping images.
Figure 26:
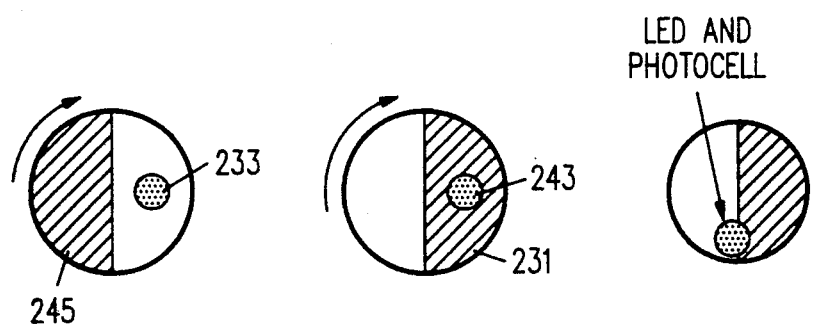
FIG. 26 diagrams rotating shutters used in system diagrammed in FIG. 25.
Figure 27:
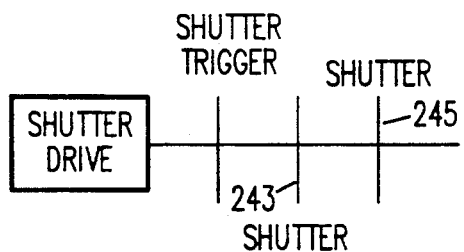
FIG. 27 shows a system to drive said shutters and generate a trigger signal to control the projection of left and right images.

The above arrangement can be used as shown in FIG. 25 with the right and left images 235, 237 overlapped on screen 238 provided that some method is used to allow only one eye 231, 233 at a time to see the overlapped image. For example, two rotating shutters 243, 245 as shown in FIG. 26 rotating at 24 or 30 times a second alternately allow one eye 231, 233, respectively, to view the overlapped image 235, 237 at a time. (The shutters could have two opaque and two transparent segments each and be rotated at half speed). FIG. 27 shows a conceptual diagram of a system to drive the shutters 245, 243 and generate a trigger signal to control the projection of the left and right images 237, 235. Two projectors can be used with shutters, one for each eye image. The trigger then can be used to keep the eye shutters properly synchronized.

Figure 28:
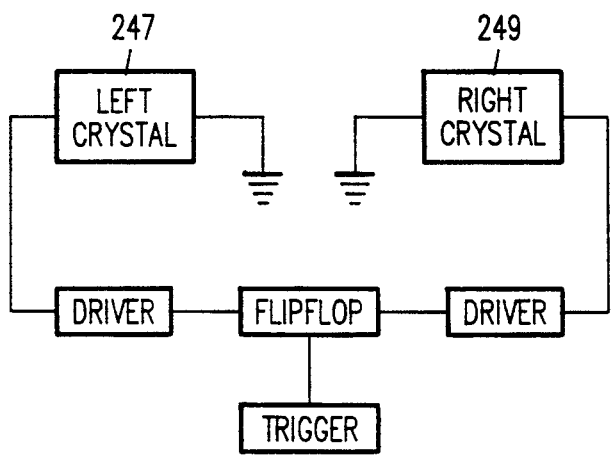
FIG. 28 is a conceptual block diagram illustrating an optical arrangement eliminating moving parts which employs crystals that can be made opaque or transparent.

Moving parts can be eliminated by optical arrangements employing crystals that can be made opaque or transparent based on an applied electrical signal. An alternate method could employ a crystal that changes (rotates) the plane of polarization based on an applied voltage. When a crystal of this type is used in combination with a polarizing filter, the light path can be open or blocked. FIG. 28 shows a conceptual block diagram for a circuit to control voltage-controlled crystal 247, 249 characteristics.

Figure 29:
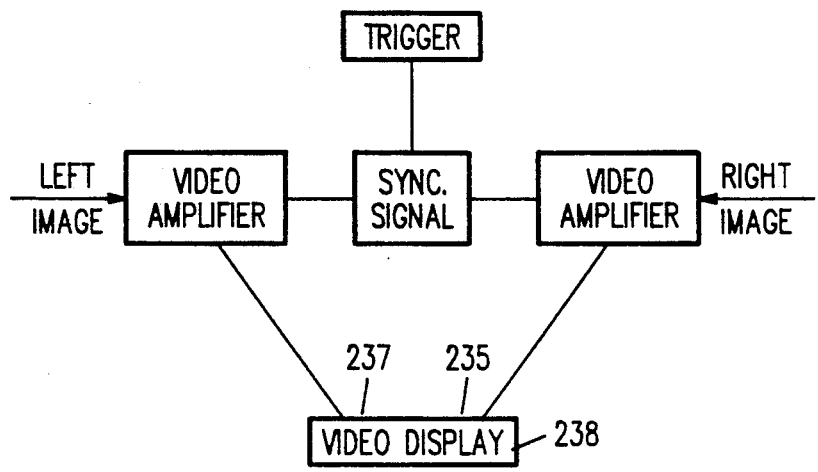
FIG. 29 is a functional block diagram illustrating a system to generate the visual images of the system shown in FIG. 25.

The un-energized system is configured with the polarizer and crystal polarization at some angle, 45 to 90 degrees, for example, to each other. When a voltage signal is applied to the crystal, the polarization of the crystal is rotated to align with the polarization of the polarizer which allows light to pass through. The images 235, 237 can also be polarized to provide additional control of light paths. FIG. 29 shows a conceptual block diagram of a system to generate the visual images 235, 237 displayed on screen 238 as shown in FIG. 25.

Figure 13:
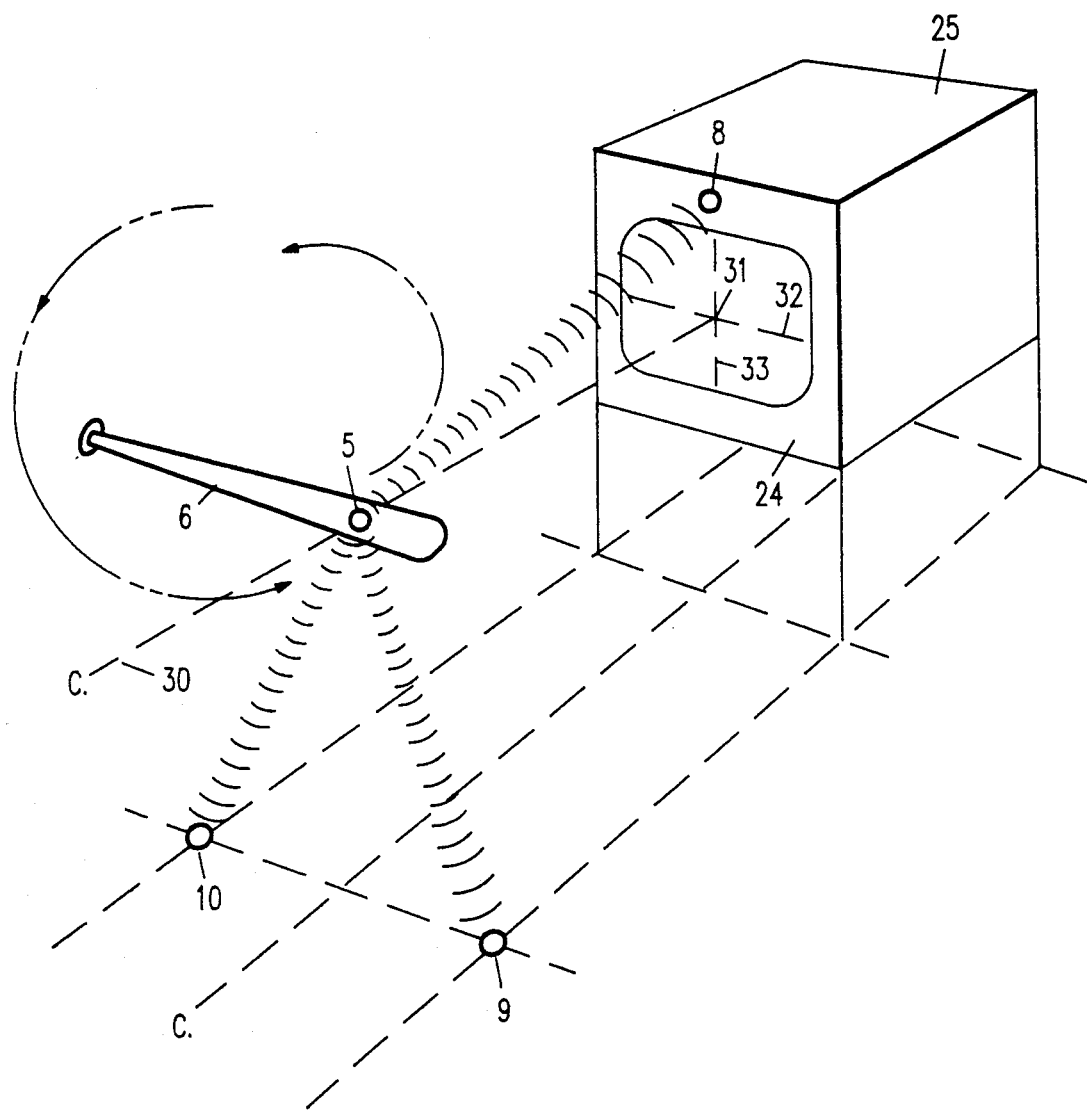
FIG. 13 is a diagram in perspective showing the placement of discrete point microphones in a pyramid array with a playing instrument incorporating a sonic transducer before a video monitor illustrating another embodiment of the present invention.

Referring to FIGS. 10 and 13 an embodiment of ultrasonic position detection incorporationg 3-D stereo visual perception is shown. A transducer 5 is installed in a baseball bat 6, as shown, or in the socket of a catcher's glove. Three point microphones installed at points 8, 9, and 10 together with transducer 5 creates pulse readouts measured as shown in FIGS. 10 and 13 that establishes the mid-air position of transducer 5, and this position is interactively related to the 3-D animation mid-air position of, in this case, a baseball pitch. The player may also see and catch a slow moving thrown ball using a catcher's glove with transducer 5 installed. The catch is registered by the system when the animation ball position compares to the glove transducer 5 mid-air position. Mechanical or electronic means create an agitation in the socket of the glove to simulate reality with the system sound effects. Another system embodiment enables the player to swing a racket before the screen or video monitor, hit the mid-air stereo visual 3-D projected image of a perspective ball animated action, return the ball back to the animated character opponent in stereo 3-D perspective action, and play a simulated game exercising the same skills as the game simulated. Such games, as tennis, ping-pong, badminton are thus played on animated stereo 3-D courts that change stereo 3-D perspectives as the action progresses from side to side of the court. Multiple stereo 3-D embodiments include the rifle described.

The process of producing animation provides means to provide two images of animated scenes calculated for each eye to create a stereo perception illusion of art work that is of only two dimensions. The cel animation may be photographed on the animation camera in two positions that widen as the foreshortened perspective action approaches the viewer. The right eye sees a cel drawing adjusted on the moving top or bottom pegs of the animation camera to a position toward the left, while the left eye sees another positioning of the same cel drawing 10 adjusted on the pegs to a position toward the right. And, two different animation drawings may be animated, in another means, to create different perspectives for each eye. Of course, such a process requires double the amount of animation drawings. Another means to create a stereo perception illusion is in the background art. The animation camera incorporates multiple moving top and bottom pegs. These pegs carrying sections of backgrounds may move at different speeds (spacing) according to the depth of perspective for each level. A tree in the background foreground would move on wider moves per frame than a grove of trees in the background distance. This movement is also augmented by slightly different peg positions of the tree and grove for each eye. If the animation camera is moved up or down from the compound art work, the resulting truck in or back is reinforced by separating or joining background levels, as trees, foreground objects on the sides of the scene, and these moves may also be calculated for each eye.

We have discovered embodiments extending the scope and effectiveness of the inventions and embodiments thereof described hereinabove and in the referenced U.S. patents by improving and advancing interactive dramatics between the player and the animated characters and graphics. The improved reactions of the animated characters and objects are based on the player's actions, speed of the player's actions and positions of the player and playing instrument, all obtained by transducer/microphone readouts.

Figure 14:
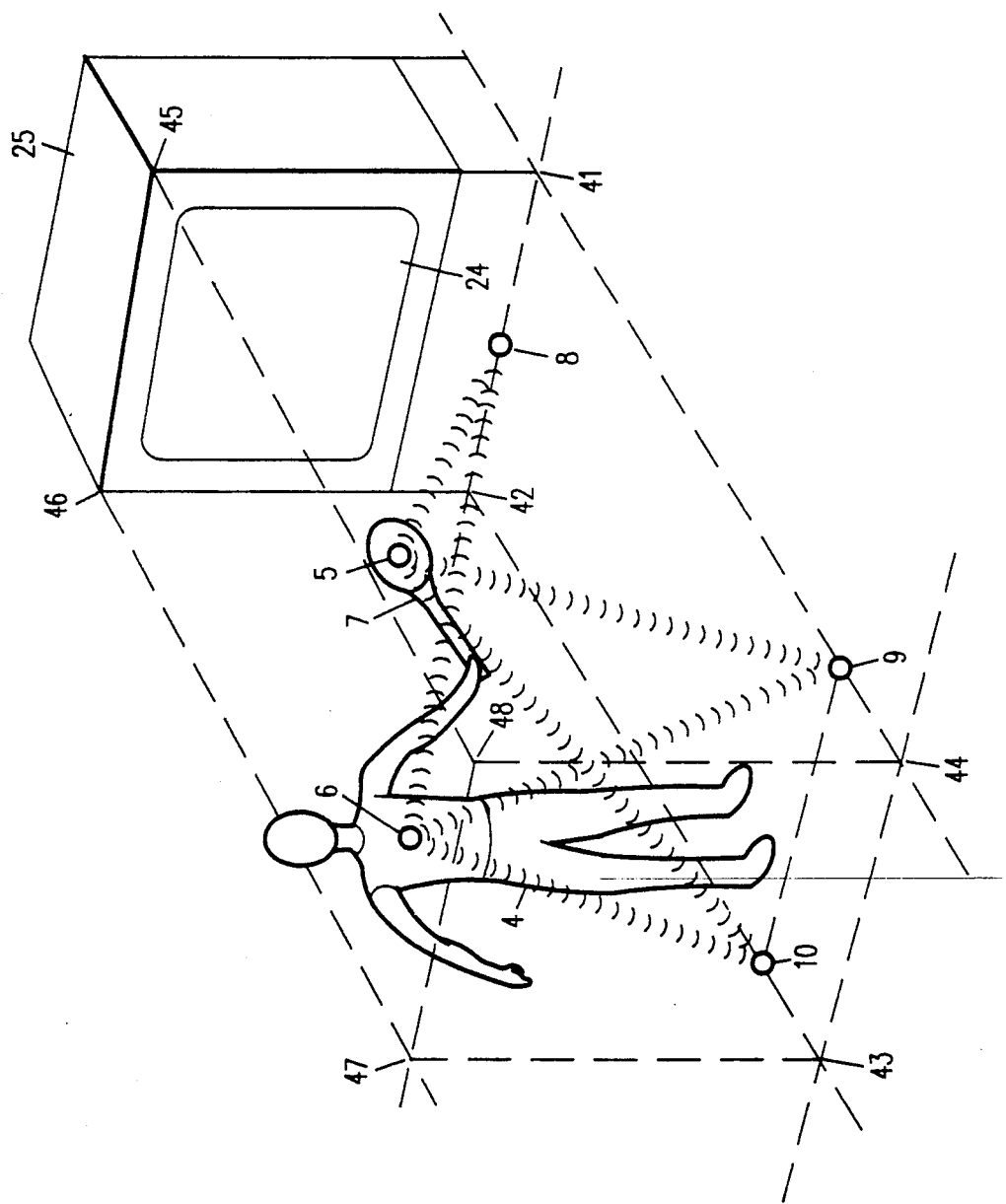
FIG. 14 is a diagram in perspective showing the placement of discrete point microphones in a triangular array with a player and playing instrument having transducer mounted thereon before a video monitor illustrating another embodiment of the present invention.
Figure 15:
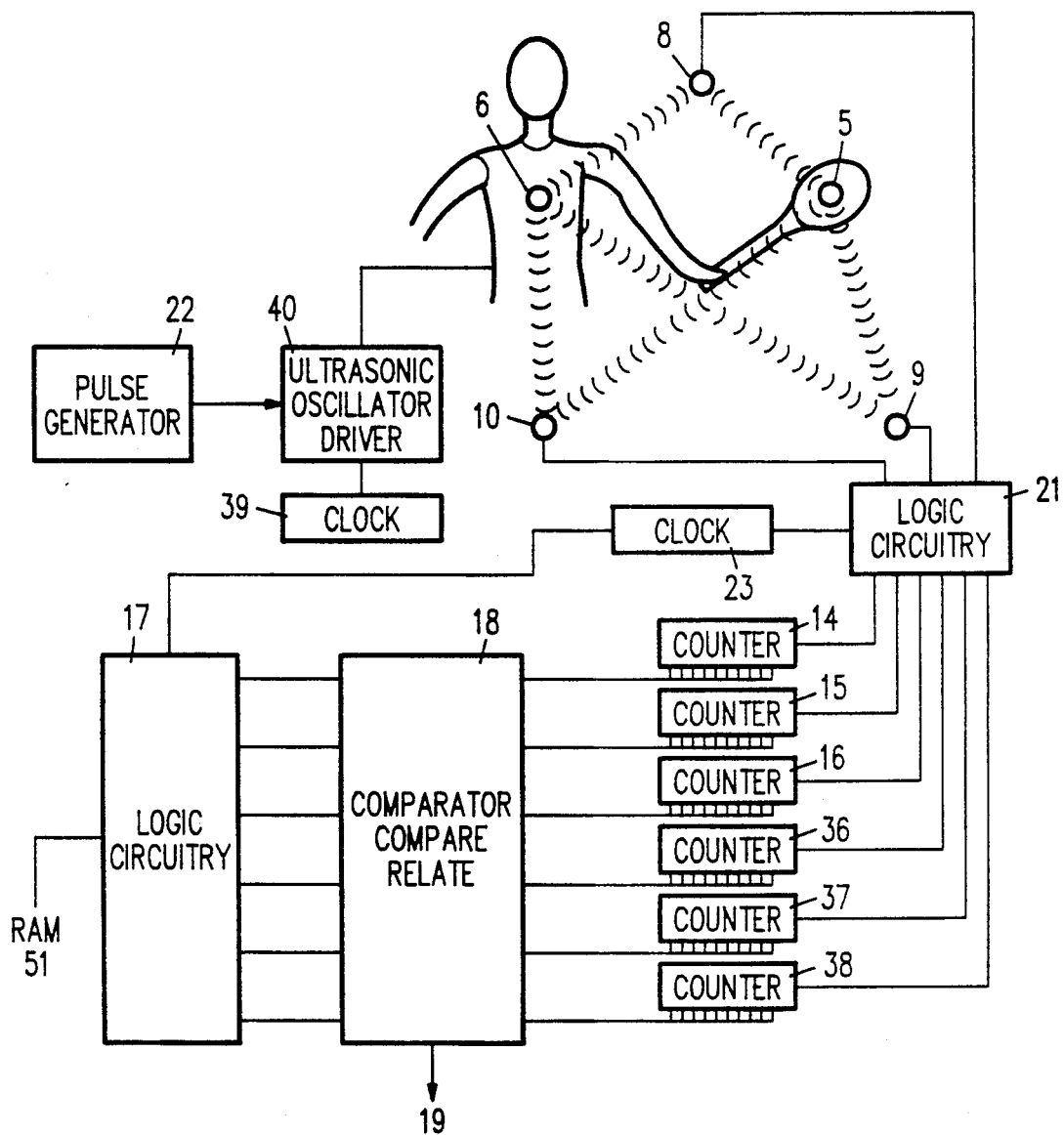
FIG. 15 is a functional block diagram of an alternate circuit of FIG. 1 implementing the system shown in FIG. 16.

Referring now to FIGS. 14 and 15, a system and associated circuitry for improved interactive dramatics between a player and displayed animated action sequences is shown. In FIG. 14 a transducer 6 is mounted on the body of player 4 and a transducer 5 is mounted in a glove or playing instrument 7. The player moves in an area whose base on the floor is located by the corners at positions 41-42-43-44 before video monitor 25. Transducers 5 and 6 working with an array of discrete point microphones 8, 9 and 10 provide accurate determination of the three coordinates of the mid-air position of player transducer 6 and playing instrument transducer 5. As shown in FIG. 15 a portable battery operated module that is mounted on the player 4 includes a pulse generator 22 and an ultrasonic oscillator 40 keyed to produce pulses of ultrasonic energy at a fixed repetitive rate. A crystal controlled time base 39 (synchronized with time base 23) synchronizes the frequency, pulse width, and repetitive rate of the pulses. Transducers 5 and 6 each produce a pulse signal differing in pulse width and frequency. Accordingly the portable module produces alternating pulses of two different types, one type emitted by transducer 5, and another type emitted by transducer 6. Discrete point microphones 8, 9, and 10 detect the ultrasonic energy emitted by transducers 5 and 6. Logic circuitry 21 recognizes the designation of each alternating type pulse by the pulse width and frequency. Accordingly, logic circuitry 21 divides the pulse signals from the microphones 8, 9, and 10 to become six pulse signals to measure the three coordinates for each transducer 5 and 6 positions. Counters 14, 15, 16, 36, 37, 38 convert the pulse data to digital form to be compared by comparator 18 to digitally coded animation location data corresponding to the animated display on the monitor 25 at a (time) frame.

The means of measuring the speed of the player transducer 6 and the playing instrument transducer 5 is based on measuring the velocity of the transducers 5, 6 relative to the receiving microphones 8, 9 and 10.

Figure 16:
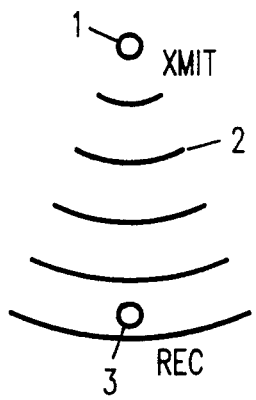
FIG. 16 is a conceptual diagram of the transmission of pulse waves to a single-point receiver by an ultrasonic transponder.
Figure 17:
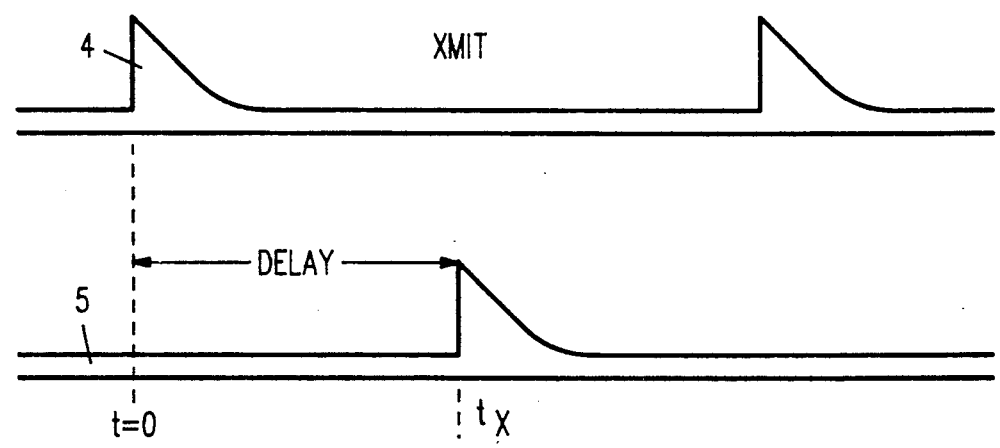
FIG. 17 is a timing diagram of ultrasonic pulses transmitted and received.

Various well-known means of ultrasonic measurement may be used according to the game needs, distances, and vector geometry. FIG. 16 shows an ultrasonic transponder XMIT 1 which transmits audio waves or pulses 2 in response to an electrical signal. These are received by a single-point microphone REC 3. FIG. 17 shows these pulses transmitted in position 4 and received at position 5. To avoid problems with ambiguity, the transmit pulses, must be spaced in time farther apart than the longest distance of interest to be measured. Alternatively, the receiving microphone REC 3 may be gated. A clock or digital counter is initiated by the transmit pulse. When the leading edge of the received signal is detected, the counter is stopped. The time "tx" can be converted to distance when the velocity of sound in the medium is used as a scale factor. This process is simple if it occurs in one plane, if point receivers and transmitters are used and there are no reflections. An additional measurement to determine relative motion between the transmitter and the receiver can be made using the Doppler effect. The Doppler effect is determined by measuring the frequency of the received pulses and comparing this frequency to the frequency of the transmitted pulses. The change in frequency between the transmitted pulse and the received pulse is a measure of the velocity of the transmitter relative to the receiver, and is a factor in determining the velocities of the transmitter 5 mounted on the playing instrument 7 and the transmitter 6 mounted on the player's body 4.

There are two ways to determine velocity from the invention system: A) change in position divided by time interval between two measurements; and B) the Doppler effect. As the measurement does not have to be precise for game playing, it will be easier to use the Doppler effect. The Doppler effect provides a measurement only of the component of velocity in the direction of a line between the object or transmitter and the sensor. To calculate the total velocity, three sensors in three coordinates are used and the vectors added. For the speed measurements of the system, it may be sufficient to use just the measurement of one coordinate.

The movement of the player transducer 6 and the player instrument transducer 5 shown FIGS. 14 and 15 is in paths of action and directions that are calculated from the progressing frames of positions determined by the coordinates of the transducers 5 and 6. A three dimensional playing area before monitor 25 of FIG. 14 has a base 41-42-43-44 and a top 45-46-47-48 and may be divided into area zones. Also a zone curing area may be calculated around the animated character or object displayed on the face of the monitor screen 24 or at the projected mid-air position of animated foreshortened perspective actions. Accordingly, the velocity, mid-air position, monitor screen 24 contact position, path of action, direction of path of action, zone position relative to the video monitor, and zone position relative to the displayed animated character are position measurements of the player 4 and playing instrument 7 that are compared to position and schedule data relative to the animation display which is coded in the animation production or supplied by program memory cartridge 26 for access from memory storage RAM 51 of FIG. 1 to generate a sequence of digital commands to direct the animation display. This embodiment of the present invention increases the degree of animated character dramatic sensitivity to the player actions and thus creates a sense of reality. Accordingly, if the player approaches the screen, the animated characters may react and run away or attack. A player moving away from the screen may cause animated characters to appear. If the player moves in any direction the animated character may appear to follow. A quick move by the player may frighten the animated characters. Any move by the player may cause a reaction in the animation. The movement of the player into area zones related to the monitor, or related to the animation character and display, may cause a reaction, or schedule of reactions, by the animated character.

The embodiment described extends the scope of game action. Tennis or Ping-Pong games as contemplated in U.S. Pat. No. 4,695,953 are improved by the realistic and more sensitive reactions of the animated character opponent to the player moves, direction, area position, and speed.

Figure 18:
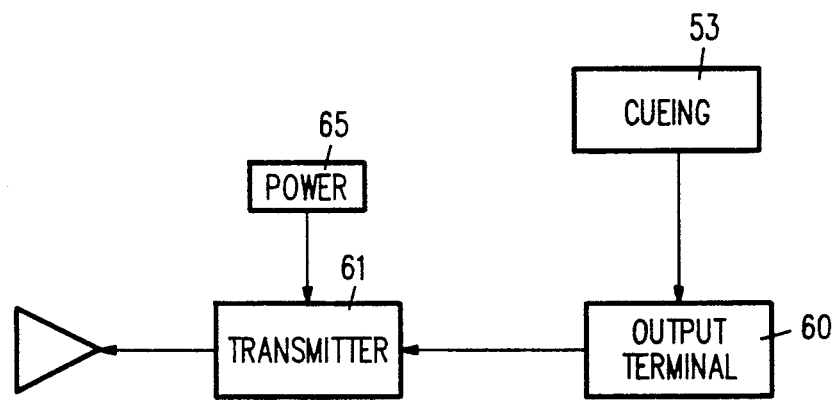
FIG. 18 is a conceptual block diagram of an output terminal of the system shown in FIG. 1 that broadcasts digital control data to remote modular apparatus.
Figure 19:
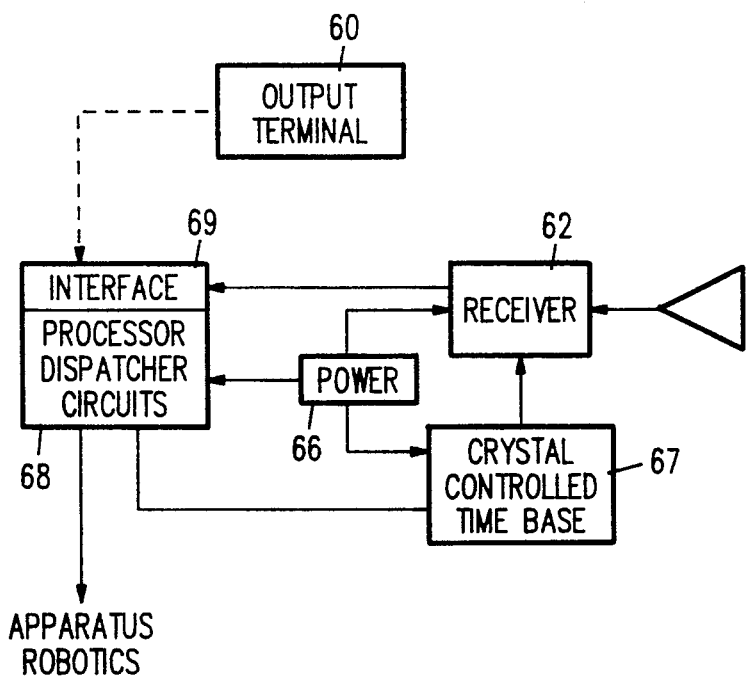
FIG. 19 is a conceptual block diagram of an input terminal of remote modular apparatus that receives transmissions from the system output terminal shown in FIG. 18.

Referring now to FIGS. 1, 18 and 19, the system of FIG. 1 provides the capability of controlling the action of remote vehicles and other apparatus based on feedback of actions of such remote apparatus. FIG. 18 shows a functional block diagram wherein output terminal 60 receives commands and other data for remote modular apparatus or robotics and transmits the data in digital or analog form via transmitter 61 to such apparatus. As shown in FIG. 19, remote modular apparatus includes input circuitry for receiving commands and other data via a receiver 62 which is controlled by a crystal controlled time base 67. Command and data signals are coupled through interface 69 to allow the use of multiple modules to processor 68 within the remote apparatus to operate the module. Alternatively, output terminal 60 may be directly coupled to interface 69 for relaying command data to interface 69 and hence to processor 68. Commands and other data transmitted to processor 68 are generated by the system circuit shown in FIG. 1 and coupled to the output terminal 60 via cuing unit 53.

An embodiment of a modular apparatus which may be controlled by data from cuing unit 53, is diagrammed as apparatus 7 in FIGS. 20, 21 and 22. Apparatus 7 operates in a coded area before video monitor 25 as shown in FIG. 14. Transducers 5 and 6 are shown installed at extremities of apparatus 7. Transducers 5 and 6 emit ultrasonic pulses provided by pulse generator 22 and ultrasonic oscillator driver 40 according to a crystal controlled time base 39. As previously described, microphones 8, 9, and 10 receive pulses and the position coordinates are measured in the same manner as in the description of the operation of FIG. 12. As we have described the system function in relation to FIGS. 11, 12, 14 and 15, the determination of the coordinates of the moving transducers 5 and 6 supply the mid-air position, the coded zone area position, the speed and direction of movement of the transducers, and the point on the video screen 24 of FIG. 11 that is the intersection of a projection of a line between the transducers and the screen 24, all of which may be compared to animation display coded data, as described, to effect both the video display multiple track switching and the behavior or restriction of the behavior of apparatus 7 while being manually operated by the trainee or player. The scope of the combinations of the above factors encompasses multiple simulated training or entertainment apparatus controlled before the video screen.

Referring to FIG. 20 the apparatus 7 operating as a module before a theatrical size video screen 24 may be embodied as a simulated vehicle 7 driven by the operator. Transducers 5 and 6 are mounted on the sides of vehicle to register tilt. The vehicle 7 is mounted on a mechanism controlled by animation coded data transmitted as shown in FIGS. 18 and 19, and as described above. The vehicle 7 also moves from side to side according to the inputs generated steering by the operator. The position of the vehicle 7 before the video screen 24 is continuously established by command digital coordinates from coded data determining the distances of transducer 6 to microphones 8, 9 and 10 and transducer 5 to microphones 8, 9 and 10 to adjust the vehicle 7 to simulate the wheels running on animated racetrack displayed on the screen 24. Accordingly, the vehicle elevates and tilts to fit the displayed animated racetrack and the operator steers the vehicle from side to side on the displayed animated racetrack.

The operator steering of the simulated vehicle can effect the animated display related to the steering in various embodiments. The operator steering of the vehicle is free and unrestricted to steer the vehicle off the racetrack at either side. Simulating reality, the event of such an accident effects both the animation and vehicle. The intrusion of the vehicle into coded areas before the screen triggers an animated reaction including sound effects and the violent shaking of the vehicle.

Another embodiment provides animated obstacles on the oncoming foreshortened perspective animated racetrack that may animate out of the way, or they may not. Defensive driving is required by the driver. If the coordinates of the location of the vehicle 7 match the coded coordinates of the displayed obstacle, at frames of the animation depicting collision, the system effects track switching as previously described.

Referring to FIG. 20, the apparatus vehicle 7 may be steered by the operator to aim at a projected point on the video screen 24, and thus effect the animation aimed at, or effect the animation based on an indication related to the point of aim. FIG. 21 shows a line 1 projected through transducer locations 5 and 6. A line 2 is projected from the center of the distance between transducers 5 and 6, normal to line 1, forward to the video screen surface 24, at point of aim 3. The screen coordinates of the point of aim 3 may be determined by a method using the distance 5-6 as the fixed distance of the hypotenuse of right angle triangles. The method is illustrated in FIGS. 11 and 12 and described in an embodiment of object 7 as a rifle. The added calculation of the projection line 2 at right angles to the projection line used in the rifle embodiment is incorporated in the process. An embodiment example may provide the selection of one of a number of forking routes of the oncoming roadway at a branching point in the animated roadway of a designated frame wherefrom multiple tracks originate depicting multiple routes of the separating road. The animation track of the branching route aimed at by the vehicle is selected by the system for display.

The determination of the point of aim 3 by simulation vehicle 7 on video screen 24 is a process instrumental to an embodiment using a simulated gas pedal effecting the speed of the oncoming perspective foreshortened animated roadway giving the illusion of speed to the vehicle 7. As the gas pedal is pushed to the points of accruement per frame, the mechanism of the pedal effects a truck to a smaller field (in animation production terms) using circuitry for selecting a smaller TV field fraction of the animation production field, then centering and expanding the selected picture so as to occupy the entire raster of the tube. The centers of the successive reduced fields are an aligned series aimed at point 3 on screen 24.

FIG. 22 diagrams object 7 of FIGS. 11 and 12 as a cannon mounted on a tank simulation, as the forward guns in an aircraft, or other weaponry simulation. The simulated craft and weapon is operated to aim at a point 3 on the video screen 24. When triggered the point of aim 3 is determined as described in relation to the rifle embodiment diagrammed in FIGS. 11 and 12. If the aim is correct the displayed animation depicts a simulation of reality at the point of aim 3. When triggered the vehicle 7 reacts with sound effects simulating reality. The process saves ammunition and affords infinite simulated firings and practice to improve skills.

In another example, an amusement park embodiment of tennis or ping pong games as contemplated in U.S. Pat. No. 4,695,953 is played before a theatrical video screen. A moving floor similar to moving belt walks installed in airports may be moved to match corresponding animation pan background moves displayed in the animation. The animation is coded to produce digital commands by the system moving the floor to fit the game or dramatic action of the display. The output terminal 60 of FIG. 18 transmits control commands to the modular apparatus operating the moving floor based on the location of the player and the direction, path, and speed of the game action effecting animation pan background moves.

Toy and amusement devices operated by remote modular apparatus as diagrammed in FIGS. 18 and 19 may be activated and controlled by animation coded data to react to the displayed animation, and may be manually operated simultaneously. Another embodiment may be a toy dog that progresses according to operator control, and also barks or acts in reaction to the displayed animation.

Toys that are confined to an area or that are stationary in location although moving may be installed adjoining the video screen in locations whose coordinates in relation to microphones 8, 9 and 10 of FIG. 14 are coded in the system to be compared to coordinates of the player 4 and thus control the toy. Other embodiments may be toys that react to player action and animation action simultaneously. For example, a parrot may speak to the player when approached or comment and squawk about the animation display. Puppets activated by mechanical means may function as an audience reacting to specific player action or animation action or both. Action based on a comparison of player coordinates to environmental coordinates may be activated by the location of the player and the direction, path, and speed of the player's actions.

The present invention contemplates scoring, grading the operator's action and response, timing game action, and recording data by remote modular apparatus. The operational data is relayed from the system by cuing unit 53 of FIG. 1 to output terminal 60 and hence wired or transmitted to remote modular apparatus as diagrammed in FIGS. 18 and 19. There are numerous other embodiments that include scoring and game timing displays and clock devices that show the progress of mulitple games, such as tennis. Remote switching devices may turn off or on the lights in a room to match game explosion displays, game disasters, or darken the lights for dramatic effect. Educational embodiments include clocks and displays timing and grading the student response.

While the motion picture display of the present invention has been described as animation, it is understood that live-action motion pictures may be manufactured, produced, shifted by optical printing, retimed and analyzed for the coordinates of the positions of moving objects to parallel the animation production methods of the invention, and thus be operated by the invention apparatus to perform the unique functions herein described. Live-action motion picture frames may be enlarged and printed on animation size paper; then, moving characters may be cut out, put on animation cells (of clear plastic sheets), placed on animation or photographic backgrounds and photographed on motion picture film according to the animator's exposure sheet to parallel the animation method and production coding process of the invention. Computer generated images may be organized and analyzed to determine the coordinates of moving objects to parallel the invention process.

While the invention has been described with reference to preferred means and embodiments, it is understood by those skilled in the art that other means of position detection, such as a light pen, mouse or joystick various modifications, alternate arrangements, different circuits and apparatus that parallel the animation method and production coding and coordinate matching process of the invention are within the scope of the invention performing the unique functions of the invention. Therefore, animation descriptions, circuits specified, and apparatus specified should not be construed as limiting the scope of the invention.

What is claimed is:

1. A video system providing repeated switching of multiple tracks of animation and rewinding to specific locations responsive to positions indicated by a user on pages having printed images of a book having a registration portion, said video system including a primary circuit comprising:
   storage means for storing multiple tracks of animated motion picture sequences, said animated motion picture sequences including coded frames for track switching and coded page location coordinates corresponding to preselected printed images on the pages of the book;
   video switching means coupled to said storage means for switching said multiple tracks of animated motion picture sequences for rewinding thereof to specific locations for track selection;
   a first user input terminal, including—
      an indicating instrument having a transducer installed at a tip thereof to produce signals,
      a portable book frame having detection means, installed in mutually perpendicular sides thereof, for detecting the signals from said transducer, the registration portion of the book positioning said portable book frame in a registered position over a selected page of the book, means for producing digital position signals representative of coordinates of a placement location of said indicating instrument with respect to the printed images on the selected page for selecting a printed image, and means for identifying the book and a page number for said video system and selecting a type of video response, said video switching means responsive to said digital position signals to retrieve a selected animated motion picture sequence corresponding to the printed image selected by the digital position signals; and display means coupled to said video switching means for display of the selected animated motion picture sequence.

2. A video system as in claim 1 wherein said animated motion picture sequences include animated scenes related to said preselected printed images.

3. A video system as in claim 2 wherein said animated motion picture sequences include sound track data providing audio response associated with said animated scenes and related to said preselected printed images, said display means including audio means for providing audio corresponding to said sound track data.

4. A video system as in claim 3 further comprising audio selection means coupled to said storage means and said video switching means and responsive to a user input for selecting an audio only response to placement of said indicating instrument.

5. A video system as in claim 1 further comprising processor means coupled to said first user input terminal and said video switching means for processing said digital position signals and controlling selection, switching and rewinding of said multiple tracks of animated motion picture sequences.

6. A video system as in claim 5, further including a secondary circuit comprising:

a second user input terminal coupled to said processor means providing user input instructions for control of said video system;

graphics generating means for generating predetermined animated video image sequences from stored graphics image data for display on said display means;

memory means, coupled to said processor means and said graphics generating means, for storing said graphics image data, control data and instructions including cuing, scheduling and video processing commands; and cuing means coupled to said processor means, said memory means and said graphics generating means for executing cuing commands from a cue table for control of said graphics generating means providing animated graphics frames for display on said display means in response to inputs from said first and second user input terminals.

7. A video system as in claim 6 further including memory cartridge input means coupled to said processor means and to said display means for receiving plug-in cartridge memory for storing and providing video image data including audio data associated with preselected pages of preselected books.

8. A video system as in claim 5 further comprising computer means, coupled to said processor means and including an input terminal, for inputting user commands and instructions, said computer means responsive to said user input commands and instructions to control said video system via said processor means.

9. A video system as in claim 8 further comprising output means coupled to said computer means and controlled by said computer means for outputting system data to the user.

10. A video system as in claim 8, wherein the printed images on selected book pages comprise a diagrammatical representation of a computer keyboard, and wherein said multiple tracks of animation including keyboard data representative of visual images of the computer keyboard, said keyboard data including related instructions associated with each of said keyboard keys, said computer means responsive to the related instructions associated with user selected keys on said selected book pages.

11. A video system as in claim 1, wherein said video system is used in conjunction with workbooks, each workbook having a registration portion and pages with printed images corresponding to animated motion picture sequences, wherein said video system further comprises:

a master station producing master station command signals and comprising said first user input terminal and said display means, said display means including— a display, and sonic detection means disposed along at least two mutually perpendicular edges of said display, said sonic detection means including means for generating position signals indicative of a placement location of said indicating instrument with respect to selected visual images of a currently displayed animated motion picture sequence, said video switching means responsive to said position signals for retrieving a predetermined animated motion picture sequence corresponding to said selected visual images;

a system output terminal;

a plurality of slave stations coupled to said system output terminal and in multiplexed fashion with said master station, each slave station comprising:

a user input terminal including a moveable indicating pen having a sonic transducer installed at a tip thereof to produce sonic signals, a portable work book frame having sonic detection means, mounted in mutually perpendicular edges thereof, for detecting the sonic signals from said moveable indicating pen, the registration portion of each workbook positioning said portable workbook frame in a registered position over a selected workbook page means for generating workbook position signals indicative of a placement location of said movable indicating pen with respect to the printed images on said selected workbook page for indicating a selected printed image, means for identifying the workbook and the selected workbook page for said video system and selecting a type of video response, said video switching means responsive to said workbook position signals to retrieve a selected animated motion picture sequence corresponding to said selected printed image, and video monitor means coupled to said video switching means for display of said selected animated motion picture sequence; and networking means for coupling said master station to said plurality of slave stations in a switched and multiplexed fashion, including control means responsive to the master station command signals for controlling the display on said master station display means and on said video monitor means of said slave stations.

12. A video system as in claim 11 wherein said master station includes graphic means, coupled to said master station input means, said display means and said networking means and responsive to said digital position signals, for displaying user originated graphics on said display means and on selected video monitor means of said slave stations.

13. A video system as in claim 12 further including communications means providing audio communications between a first user located at said master station and second users located at selected ones of said plurality of slave stations.

14. A video system providing repeated switching of multiple tracks of animation and rewinding to specific locations responsive to positions indicated by a user on a surface of a study object, said video system including a primary circuit comprising:

storage means for storing multiple tracks of animated motion picture sequences, said animated motion picture sequences including coded frames for track switching and coded page location coordinates corresponding to preselected positions on the surface of the study object;

video switching means coupled to said storage means for switching said multiple tracks for rewinding to specific locations for track selection;

a user input terminal, including—
 a moveable indicating instrument having a transducer installed at a tip thereof to produce signals,
 detection means, disposed in fixed relationship to said study object, for detecting the signals from said transducer, and
 means for producing position signals representative of coordinates of a placement location of said moveable indicating instrument with respect to preselected positions on the surface of the study object, said video switching means responsive to said position signals for retrieving said animated motion picture sequences corresponding to a selected one of said preselected positions on the surface of the study object; and display means coupled to said video switching means for display of said selected animated motion picture sequence.

15. A video system as in claim 14 wherein said animated motion picture sequences include animated scenes related to the study object and corresponding to the preselected positions on the surface of the study object.

16. A video system as in claim 14,
wherein said animated motion picture sequences include sound track data providing audio response associated with said animated scenes and related to the study object and corresponding to the preselected positions on the surface of the study object, and
wherein said display means includes audio means for providing audio corresponding to said sound track data.

17. A video system as in claim 14 further comprising rotating means coupled to the study object for rotating the study object about a predetermined axis of revolution to a one of a plurality of predetermined fixed positions, said multiple tracks of animated motion picture sequences including a plurality of predefined animated motion picture sequences, each associated with one of said plurality of predetermined fixed positions.

18. A video system as in claim 1 wherein said indicating instrument comprises a glove worn by the user, said transducer mounted in a fingertip of said glove.

* * * * *